(12) United States Patent
Makwana et al.

(10) Patent No.: US 12,516,809 B2
(45) Date of Patent: Jan. 6, 2026

(54) BURNER AND METHOD FOR TRANSIENT HEATING

(71) Applicant: Air Products and Chemicals, Inc., Allentown, PA (US)

(72) Inventors: Anandkumar Makwana, Breinigsville, PA (US); Anup Vasant Sane, Allentown, PA (US); Michael David Buzinski, Slatington, PA (US); Xiaoyi He, Orefield, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 861 days.

(21) Appl. No.: 17/854,782

(22) Filed: Jun. 30, 2022

(65) Prior Publication Data
US 2024/0003539 A1 Jan. 4, 2024

(51) Int. Cl.
*F23D 14/84* (2006.01)
*F23D 14/22* (2006.01)
*F23D 23/00* (2006.01)
*F23L 9/06* (2006.01)
*F23N 1/02* (2006.01)

(52) U.S. Cl.
CPC .............. *F23D 14/84* (2013.01); *F23D 14/22* (2013.01); *F23D 23/00* (2013.01); *F23L 9/06* (2013.01); *F23N 1/02* (2013.01)

(58) Field of Classification Search
CPC .......... F23D 14/84; F23D 14/22; F23D 23/00; F23D 2900/00013; F23D 14/583; F23M 2900/05021; F23C 2900/06041
See application file for complete search history.

(56) References Cited

U.S. PATENT DOCUMENTS 3,288,198 A * 11/1966 Hein .................. F23D 14/26
431/349
5,545,031 A * 8/1996 Joshi .................. F23D 14/22
431/187
(Continued)

FOREIGN PATENT DOCUMENTS

EP 1094273 4/2001
EP 2924357 9/2015
(Continued)

*Primary Examiner* — David J Laux
(74) *Attorney, Agent, or Firm* — Jason M. Ploeger

(57) ABSTRACT

A burner including a first burner element having a first annular oxidant nozzle surrounding a first inner fuel nozzle; a second burner element having a second annular oxidant nozzle surrounding a second inner fuel nozzle, the second burner element being positioned adjacent to and spaced apart from the first burner element; a staging nozzle configured to flow secondary oxidant and being positioned adjacent to and spaced apart from the second burner element and separated from the first burner element by the second burner element; wherein the first inner nozzle and the second inner nozzle each have a major axis defined by a length L and a minor axis defined by a height $h_j$; wherein $5<=L/h_j<=15$; wherein the staging nozzle has a major axis; and wherein the major axes of the first and second inner nozzles and the staging nozzle are substantially parallel with each other.

19 Claims, 10 Drawing Sheets

(56) References Cited

U.S. PATENT DOCUMENTS

| | | | | |
|---|---|---|---|---|
| 5,554,022 | A * | 9/1996 | Nabors, Jr. | F23L 7/007 |
| | | | | 431/351 |
| 7,390,189 | B2 * | 6/2008 | D'Agostini | C03B 5/2353 |
| | | | | 431/187 |
| 8,806,897 | B2 * | 8/2014 | Watson | C03B 5/2353 |
| | | | | 65/335 |
| 9,360,257 | B2 | 6/2016 | Sane et al. | |
| 9,657,945 | B2 | 5/2017 | Gangoli et al. | |
| 9,689,612 | B2 | 6/2017 | Gangoli et al. | |
| 9,976,721 | B2 | 5/2018 | Tsuda | |
| 10,584,051 | B2 * | 3/2020 | D'Agostini | F23N 5/003 |
| 2001/0023053 | A1 * | 9/2001 | Hoke, Jr. | C03B 5/2353 |
| | | | | 431/12 |
| 2003/0054308 | A1 * | 3/2003 | Abbasi | F23C 7/008 |
| | | | | 431/89 |
| 2010/0183990 | A1 * | 7/2010 | Watson | F23C 1/08 |
| | | | | 431/181 |
| 2010/0313604 | A1 * | 12/2010 | Watson | F23L 7/007 |
| | | | | 65/347 |
| 2015/0267915 | A1 * | 9/2015 | Goruney | F23D 14/70 |
| | | | | 431/353 |
| 2021/0116125 | A1 | 4/2021 | Hewertson et al. | |
| 2023/0043686 | A1 * | 2/2023 | Yan | F23D 17/00 |

FOREIGN PATENT DOCUMENTS

| | | |
|---|---|---|
| GB | 2449267 | 11/2008 |
| KR | 20130126719 | 11/2013 |
| KR | 20150102724 | 9/2015 |
| KR | 20160138915 | 12/2016 |
| KR | 20170131459 | 11/2017 |

* cited by examiner

BURNER AND METHOD FOR TRANSIENT HEATING

FIELD

The present innovation relates to burners and methods of transient heating, and apparatuses using those burners and methods for transient heating (e.g. reverberatory furnaces, burners for reverberatory furnaces, etc.), operational aspects of the apparatuses, and methods of making and using the same.

BACKGROUND

Oxy-fuel burners are known for providing primary or supplemental heat to furnaces for a wide range of industrial applications. The present applicant owns several such patents, including U.S. Pat. Nos. 7,390,189, 8,806,897, and 10,584,051 (various designs and applications of flat-flame staged burners) and U.S. Pat. Nos. 9,360,257, 9,976,721, 9,657,945, and 9,689,312, and US Patent Pub. No. 2021/0116125 (various designs and applications of burners with multiple burner elements that can be made active or passive to direct higher or lower levels of heat to certain parts of a furnace).

SUMMARY

The present application describes embodiments of a burner that selectively directs a larger flame to one or more portions of a furnace and a smaller flame to another one or more portions of a furnace, to enable better control over temperature distribution in the furnace.

Aspect 1. A burner for transient heating of a furnace, the burner comprising: a burner face configured to be positioned at an inner surface of the furnace when the burner is mounted in the furnace, the burner face defining a burner face plane; a first burner element having a first annular nozzle configured to flow primary oxidant surrounding a first inner nozzle configured to flow fuel; a second burner element having a second annular nozzle configured to flow primary oxidant surrounding a second inner nozzle configured to flow fuel, the second burner element being positioned adjacent to and spaced apart from the first burner element; a staging nozzle configured to flow secondary oxidant, the staging nozzle being positioned adjacent to and spaced apart from the second burner element, wherein the second burner element is positioned between the staging nozzle and the first burner element; wherein the first inner nozzle and the second inner nozzle each have a major axis defined by a major axis length L measured at the burner face plane, a minor axis defined by a minor axis height hf measured at the burner face plane, and a fuel nozzle aspect ratio of $5<=L/hf<=15$; wherein the staging nozzle has a major axis defined by a major axis length X measured at the burner face plane and a minor axis defined by a minor axis height Y measured at the burner face plane; and wherein the major axis of the first inner nozzle, the major axis of the second inner nozzle, and the major axis of the staging nozzle are substantially parallel with each other to within a deviation of less than or equal to 5°.

Aspect 2. The burner of Aspect 1, wherein the staging nozzle has an aspect ratio of $10<=X/Y<=40$.

Aspect 3. The burner of Aspect 1 or Aspect 2, wherein $1<=X/L<=2.5$.

Aspect 4. The burner of any of Aspects 1 to 3, wherein the second burner element is spaced apart from the first burner element by a distance H1, wherein $2<=H1/hf<=20$; and wherein the staging nozzle is spaced apart from the second burner element by distance H2, wherein $2<=H2/hf<=20$.

Aspect 5. The burner of any of Aspects 1 to 4, wherein the minor axis of the first inner nozzle is offset from the minor axis of the second inner nozzle by a distance B, wherein $0<B/L<=1.5$; and wherein the minor axis of the first inner nozzle and the minor axis of the second inner nozzle are substantially parallel to each other to within a deviation of less than or equal to 5°.

Aspect 6. The burner of any of Aspects 1 to 5, further comprising: a pilot flame port positioned adjacent to and spaced apart from the first burner element by a distance of H3; wherein the first burner element is positioned between the second burner element and the pilot flame port; and wherein $2<=H3/hf<=20$.

Aspect 7. The burner of any of Aspects 1 to 6, further comprising: a first fuel conduit configured to supply fuel to the first inner nozzle, the first fuel conduit having a longitudinal axis aligned with a direction of fuel flow in the first fuel conduit, the longitudinal axis intersecting the burner face plane at an angle $\alpha$ with respect to perpendicular and at a complementary angle $(90°-\alpha)$ with respect to the major axis of the first inner nozzle; a second fuel conduit configured to supply fuel to the second inner nozzle, the second fuel conduit having a longitudinal axis aligned with a direction of fuel flow in the second fuel conduit, the longitudinal axis intersecting the burner face plane at an angle $\alpha$ with respect to perpendicular and at a complementary angle $(90°-\alpha)$ with respect to the major axis of the second inner nozzle; wherein longitudinal axis of the first fuel conduit and the longitudinal axis of the second fuel conduit are angled with respect to each other by an angle of $2\alpha$; and wherein $0<\alpha<=20°$.

Aspect 8. The burner of Aspect 7, wherein $5°<\alpha<=20°$.

Aspect 9. The burner of Aspect 7 or Aspect 8, wherein the longitudinal axis of the first fuel conduit intersects the plane defined by the major axis and the minor axis of the first inner nozzle at an angle $\beta$ with respect to perpendicular and at a complementary angle $(90°-\beta)$ with respect to the minor axis of the first inner nozzle; wherein the longitudinal axis of the second fuel conduit intersects the plane defined by the major axis and the minor axis of the second inner nozzle at an angle $\beta$ with respect to perpendicular and at a complementary angle $(90°-\beta)$ with respect to the minor axis of the second inner nozzle; wherein longitudinal axis of the first fuel conduit and the longitudinal axis of the second fuel conduit are each angled away from the staging nozzle; and wherein $0<\beta<=10°$.

Aspect 10. The burner of any of Aspects 1 to 6, further comprising: a first fuel conduit configured to supply fuel to the first inner nozzle, the first fuel conduit having a longitudinal axis aligned with a direction of fuel flow in the first fuel conduit, the longitudinal axis intersecting the burner face plane at an angle $\beta$ with respect to perpendicular and at a complementary angle $(90°-\beta)$ with respect to the minor axis of the first inner nozzle; a second fuel conduit configured to supply fuel to the second inner nozzle, the second fuel conduit having a longitudinal axis aligned with a direction of fuel flow in the second fuel conduit, the longitudinal axis intersecting the burner face plane at an angle $\beta$ with respect to perpendicular and at a complementary angle $(90°-\beta)$ with respect to the minor axis of the second inner nozzle; wherein longitudinal axis of the first fuel conduit and the longitudinal axis of the second fuel conduit are each angled away from the staging nozzle; and wherein $0<\beta<=10°$.

Aspect 11. The burner of any of Aspects 1 to 10, wherein a total fuel flow and a total oxidant flow are provided to the burner in an equivalence ratio, wherein an equivalence ratio of 1 denotes a stoichiometric ratio of fuel to oxidant, an equivalence ratio of greater than 1 denotes a fuel-rich stoichiometry, and an equivalence ratio of less than 1 denotes a fuel-lean stoichiometry, the burner further comprising: a controller programmed: to independently control fuel flow to each of the first inner nozzle and the second inner nozzle; and to control distribution of the total oxidant flow to consist of a primary oxidant flow apportioned between the first annular nozzle and the second annular nozzle and a secondary oxidant flow provided to the staging nozzle, wherein the primary oxidant flow is from 60% to 95% of the total oxidant flow.

Aspect 12. The burner of Aspect 11, wherein the primary oxidant flow apportioned between the first annular nozzle and the second annular nozzle in a ratio from 0.9 to 1.1.

Aspect 13. The burner of Aspect 11 or Aspect 12, wherein the controller is programmed to operate the burner in a proportional mode in which the total fuel flow is supplied to the first inner nozzle and the second inner nozzle such that the equivalence ratio of the first burner element is from 1.05 to 1.5 and the equivalence ratio of the second burner element is from 1.05 to 1.5.

Aspect 14. The burner of any of Aspects 11 to 13, wherein the controller is programmed to operate the burner in an alternating mode in which apportionment of the total fuel flow between the first inner nozzle and the second inner nozzle switches back and forth between a first state in which the first burner element is active while the second burner element is passive and a second state in which the first burner element is passive while the first burner element is active; wherein an active burner element is characterized by an equivalence ratio from 1.4 to 3 and a passive burner element is characterized by an equivalence ratio from 0.1 to 1.

Aspect 15. The burner of Aspect 14, wherein the controller is programmed to switch between the first state and the second state based on one or more of passage of a predetermined time period and data from a sensor positioned to detect at least one condition in the furnace.

Aspect 16. The burner of any of Aspects 1 to 15, wherein the first annular nozzle and the second annular nozzle each have a major axis and a minor axis coincident with the major axis and the minor axis of the first inner nozzle and the second inner nozzle, respectively, wherein the minor axis of each of the first annular nozzle and the second annular nozzle is defined by a height ho; wherein fuel exits each of the first inner nozzle and the second inner nozzle at a fuel velocity; wherein primary oxidant exits each of the first annular nozzle and the second annular nozzle at a primary oxidant velocity; and wherein a ratio ho/hf is sized to yield a ratio of the fuel velocity to the primary oxidant velocity from 1 to 4.

Aspect 17. The burner of any of Aspects 1 to 16, further comprising: a pilot flame port positioned below the first burner element, a top of the pilot flame port being vertically spaced from a bottom of the first annular nozzle by a third vertical spacing H3 such that $2<=H3/hf<=20$; and wherein a bottom of the second burner element is spaced apart from a top of the first annular nozzle by a first vertical distance H1, wherein $2<=H1/hf<=20$; and wherein a bottom of the staging nozzle is spaced apart from a top of the second annular nozzle by a second vertical distance H2, wherein $2<=H2/hf<=20$; and wherein the minor axis of the first inner nozzle is offset from the minor axis of the second inner nozzle by a distance B, wherein $0<B/L<=1.5$; and wherein the minor axis of the first inner nozzle and the minor axis of the second inner nozzle are substantially parallel to each other to within a deviation of less than or equal to 5°.

Aspect 18. A furnace comprising: a wall; a roof; a bath of solid and/or liquid material; and the burner of any of Aspects 1 to 17 positioned in the wall so that the first burner element is closer to bath than the second burner element and the staging nozzle is closer to the roof than the second burner element.

Aspect 19. A method of operating the burner of any of Aspects 1 to 17 in a furnace, the method comprising: flowing a total oxidant flow to the burner consisting of a primary oxidant flow apportioned between the first annular nozzle and the second annular nozzle and a secondary oxidant flow provided to the staging nozzle, wherein the primary oxidant flow is from 60% to 95% of the total oxidant flow, and wherein the primary oxidant flow apportioned between the first annular nozzle and the second annular nozzle in a ratio from 0.9 to 1.1; flowing a total fuel flow to the burner, and switching operation of the burner between a proportional mode and an alternating mode; wherein in the proportional mode, the total fuel flow is apportioned between the first inner nozzle and the second inner nozzle such that the equivalence ratio of the first burner element is from 1.05 to 1.5 and the equivalence ratio of the second burner element is from 1.05 to 1.5; and wherein in the alternating mode, the total fuel flow apportioned between the first inner nozzle and the second inner nozzle switches back and forth between a first state in which the first burner element is active while the second burner element is passive and a second state in which the first burner element is passive while the first burner element is active, wherein an active burner element is characterized by an equivalence ratio from 1.4 to 3 and a passive burner element is characterized by an equivalence ratio from 0.1 to 1; and wherein an equivalence ratio of 1 denotes a stoichiometric ratio of fuel to oxidant, an equivalence ratio of greater than 1 denotes a fuel-rich stoichiometry, and an equivalence ratio of less than 1 denotes a fuel-lean stoichiometry.

Conventional oxy-fuel burner technology is for oxy-fuel burners, which are often either single flame directed at the melt or combust in the space above the bath surface. Most currently offered multi-flame burners can be mounted on the roof of a reverb furnace. However, in many furnaces it is challenging to mount the burner on the roof and they are not rated to operate as a fuel flexible burner. Additionally, the next generation of decarbonized and less greenhouse emitting fuels may need a burner that can be used with traditional fuels like natural gas while also being flexible on the suitable fuel type so that they can also be operated with mixtures of natural gas and hydrogen or with pure hydrogen.

We also determined that melting furnaces often require that heat be uniformly distributed in the furnace to improve the overall melting characteristics of the furnace. Flameless combustion is one such way to help provide improved uniformity for heat distribution. However, flameless combustion doesn't have soot formation, which can reduce the overall heat transfer to the bath surface due to absence of radiative heat transfer from soot to the bath. We determined it is desirable in melting furnaces to increase the radiative heat flux from the soot particles to the melt while also providing improvement in the uniformity of the heat distribution within the furnace. It can be important that the amount of soot that is produced is fully oxidized within the furnace volume and no soot exits through a furnace's flue. Embodiments of our burner apparatus can help solve these challenges.

Embodiments of our new burner can be configured as a double staged transient heating burner that helps in better heat transfer to the bath/melt and reduce melt overheating potential. Additionally, the burner can be fuel flexible and work with decarbonized fuels like hydrogen and hydrogen/natural gas mixtures, for example. Furthermore, embodiments can provide low nitrous oxide (NOx) emissions as compared to conventional oxy-fuel burner and can utilize lower pressure oxygen that can help to save cost of operation. Embodiments of the new burner can be used in conjunction with other air-fuel or oxy-fuel burners or as an independent oxy-fuel burner in melting furnaces for improved furnace operation that can provide faster melt times, increased energy efficiency, fuel savings, and potential production increase.

Embodiments of the burner can be structured and configured as both fuel-staged and oxidizer-staged. The double staging can help to achieve low NOx generation within a furnace as compared to conventional single fuel oxy-fuel burners. The oxidizer staging of the burner can help to reduce the oxygen near the bath surface, which can help avoid bath surface oxidation. The avoidance or reduction in bath surface oxidation as compared to air-fuel or conventional oxy-fuel burners can maintain or improve the furnace yield during operation of the furnace.

Additionally, embodiments of the new burner can be fuel flexible and work with traditional fuels (e.g. natural gas) and low carbon intensity fuels (e.g. hydrogen) and/or mixtures of traditional and emerging alternative fuels.

In plants that do not have access to a roof, an embodiment of our burner can be structured as a sidewall mounted flat flame burner that can provide a practical way to install the embodiment of our burner. Additionally, the two configurations for our burner (roof mountable and sidewall mountable, which can also be considered vertically oriented and horizontally oriented burner embodiments) can be used together in the same furnace to improve the overall functioning of a industrial melting furnace.

As mentioned above, we determined that it would be desirable to provide a burner for a furnace that could help mitigate, if not avoid, formation of NOx during combustion of a fuel. Some embodiments of the burner can be configured to permit the burner to be retrofit in a pre-existing furnace (e.g. a pre-existing reverberatory furnace, which can also be referred to as a reverb furnace). Embodiments of the burner can be configured to replace conventional burners in pre-existing furnaces or be utilized in conjunction with pre-existing conventional burners to provide improved performance while also providing reduced NOx emissions. Other embodiments can be utilized to fully replace all conventional pre-existing burners of a furnace or be included within a new furnace installation that can be configured to provide transient heating.

In some configurations, embodiments can be provided so a burner can be positioned on a sidewall of a reverberatory furnace above a bath of the furnace and below a ceiling (or roof) of the furnace. The burner can be adapted to permit fuel that is fed to the burner to be entirely natural gas, entirely hydrogen, or a mixture of hydrogen and natural gas. Other embodiments can utilize a different mix of fuel that can include hydrogen alone, hydrogen mixed with a hydrocarbon fuel (e.g. natural gas, oil, etc.), and only a hydrocarbon based fuel (e.g. natural gas, oil, etc.). The burner can be positionable to provide transient heating for a metal material positioned in a bath below the burner in some embodiments. In some configurations, the metal material within the bath can be metal for aluminum melting, iron melting, or other type of metal melting operation.

In some embodiments, the burner can utilize first and second burner elements that are positioned below an oxidant nozzle that is positioned to output a flow of oxidant. The first and second burner elements can each include an inner opening for emitting a fuel and an outer annular shaped opening for emitting an oxidant flow having oxygen therein that is positioned to surround the inner opening that can emit the fuel. The first and second fuel burner elements can be connected to a fuel flow control manifold assembly configured to provide fuel to the first and second burner elements. The fuel can be hydrogen gas, a natural gas, or a mixture of natural gas and hydrogen, for example. The outer openings for the first and second fuel burner elements can be connected to a source of oxidant for outputting oxygen. The oxidant source can be an output from a cryogenic air separation unit that provides a flow of oxygen to the burner elements or can be another source of an oxidant flow that can include oxygen therein (e.g. air, a gas mixture that includes a sufficient concentration of oxygen, a fluid mixture that includes a sufficient concentration of oxygen, etc.). The first and second burner elements can be arranged to be in a pre-selected alignment with each other to facilitate the formation of a stable flame that has a low NOx emission profile.

The burner elements can also be arranged and positioned to work in conjunction with the upper oxidant nozzle so that a pre-selected fuel velocity, pre-selected oxidant flow velocity, a pre-selected level of fuel staging and a pre-selected level of oxidant staging is provided to help facilitate the formation of a stable flame that has a low NOx emission profile. The pre-selected arrangement can include, for example, (1) an offset positioning of a first lower burner element and a second upper burner element in a horizontal dimension along a wall that falls within a first pre-selected orientation threshold while also including (2) a vertical spacing between the first and second burner elements being within a first pre-selected vertical spacing threshold and (3) a vertical spacing between the upper second burner element and the top oxidant nozzle that is within a first pre-selected oxidization nozzle spacing threshold, and (4) a vertical spacing between the lower first burner element and a pilot flame outlet located below the first burner element that is within a first pre-selected pilot flame spacing threshold. The length and width of the different nozzles of the burner elements can also be within pre-selected length and width ranges to work in conjunction with these pre-selected thresholds to help facilitate the formation of a stable flame that has a low NOx emission profile. The first and second burner elements can also be configured to include a pre-selected pitch ranging from −10° to 10° to provide an inclined, level, or declined flow of fuel and oxidant and a pre-selected horizontal orientation so that the burner elements may flow fuel and/or oxidant flows out at a horizontal angle relative be being straight out of the wall (e.g. at an angle of 0°) that ranges from −20° to 20°.

Embodiments of one or more burners included in a reverberatory furnace can help limit oxygen near the bath surface. Such a feature can help reduce or maintain the metal bath oxidation to a base level. Embodiments can also provide low back pressure of oxygen flows to avoid needing to use a high pressure oxygen source for the oxidant flows. For instance, some embodiments have been found to be able to reduce NOx emissions by as much as 50%. These improved results could be obtained while also improving the efficiency of furnace operations. In some embodiments, for example, it is believed that furnace operation efficiency in hybrid mode (replacing one air-fuel with one transient heating burner in a reverberatory furnace) can be improved by about 9%, production can be increased by about 26% and fuel savings of about 26% can be achieved. These improvements can be achieved while the furnace can also be adapted to work with a decarbonized fuel source (e.g. hydrogen as the fuel) to reduce carbon emissions in addition to reducing NOx emissions.

An apparatus for transient heating is provided. The apparatus can include at least one burner positionable on a wall or roof of the apparatus for transient heating above a bath of the apparatus for transient heating. Each of the at least one burner can include: a first burner element having a first outer oxidant flow outlet that surrounds a first inner fuel outlet, a second burner element having a second outer oxidant flow outlet that surrounds a second inner fuel outlet wherein the second burner element is positioned above the first burner element, and an upper oxidant flow nozzle is positioned above the second burner element.

Embodiments of the apparatus for transient heating can be a reverberatory furnace or other type of furnace or transient heating device. The at least one burner can positioned on a sidewall of the furnace above the bath. The bath can be positioned to retain metal for melting of the metal. The metal can be aluminum, steel, or other type of metal.

Embodiments can be adapted so that the one or more burners have a particular structure and arrangement. For example, the first inner fuel outlet for a burner can have a height hf and a length L measured at the burner face plane 10*fp* and the second inner fuel outlet can also have the hf and the L measured at the burner face plane 10*fp*. A top of the first outer oxidant flow outlet can be vertically spaced from a bottom of the second outer oxidant flow outlet by a first vertical spacing H1 and a top of the second outer oxidant flow outlet can be vertically spaced from a bottom of an oxidant flow outlet of the upper oxidant flow nozzle by a second vertical spacing H2 such that (a) $2<=H1/hf<=20$ and (b) $2<=H2/hf<=20$ (where "<=" is less than or equal to). The second inner fuel outlet and the first inner fuel outlet can also be arranged so that a center of the first inner fuel outlet is horizontally spaced from a center of the second inner fuel outlet by an offset distance B such that $0<=B/L<=1.5$.

Each burner can also include a pilot flame port positioned below the first burner element in some embodiments. A top of the pilot flame port can be vertically spaced from a bottom of the first outer oxidant flow outlet by a third vertical spacing H3 such that $2<=H3/hf<=20$.

The upper oxidant flow nozzle can have an oxidant flow outlet that has a length X measured at the burner fact plane 10*fp* and a height Y measured at the burner face plane 10*fp* such that $10<=X/Y<=40$ and $1<=X/L<=2.5$. Other embodiments may utilize different length and height specifications for the oxidant flow outlet of the upper oxidant flow nozzle.

As noted above, the first inner fuel outlet can have a height hf and a length L and the second inner fuel outlet can also have the hf and the L. The second inner fuel outlet and the first inner fuel outlet can be arranged so that a center of the first inner fuel outlet is horizontally spaced from a center of the second inner fuel outlet by an offset distance B such that $0.0<=B/L<=1.5$. In such embodiments, the height hf and length L can also be defined so that $5<=L/hf<=15$.

Embodiments of the apparatus for transient heating can also include other elements. For example, embodiments can include a feed conduit for the second inner fuel outlet of the second burner element that extends linearly from a second burner element fuel feed conduit to the second inner fuel outlet of the second burner element at a first pre-selected horizontal angle relative to a horizontal direction at which a pilot flame feed conduit extends linearly to the pilot flame port. Additionally, there can be a feed conduit for the first inner fuel outlet that extends linearly from a first burner element fuel feed conduit to the first inner fuel outlet at a second pre-selected horizontal angle relative to the horizontal direction at which the pilot flame feed conduit extends linearly to the pilot flame port. The first pre-selected horizontal angle can be in a range of +5° to +20° or greater than 0° and less than or equal to 20° and the second pre-selected horizontal angle can be in a range of −5° to −20° or less than 0° and less than or equal to −20°. Alternatively, the first pre-selected horizontal angle can be in a range of −5° to −20° or less than 0° and less than or equal to −20° and the second pre-selected horizontal angle can be in a range of +5° to +20° or greater than 0° and less than or equal to 20°. Other angle ranges for the first pre-selected horizontal angle and the second pre-selected horizontal angle can alternatively be utilized.

The burner elements can also be oriented and positioned to provide an inclined or declined output. For example, the first and second burner elements can be configured to include a pre-selected pitch ranging from −10° to 10° to provide an inclined, level, or declined flow of fuel and oxidant. For instance, the pitch for the feed conduits or the first and second inner fuel outlets can be greater than 0° and less than or equal to +10° or less than 0° and more than or equal to −10°. The pitch for the first burner element (and first inner fuel outlet) can be different from the pitch for the second burner element (and second inner fuel outlet) or the pitch can be the same for the first and second burner elements (and first and second inner fuel outlets). The pitch for the first outer oxidant flow outlet can be the same as the pitch for the first burner element and/or first inner fuel outlet and the pitch for the second outer oxidant flow outlet can be the same as the pitch for the second burner element and/or second inner fuel outlet (e.g. their pitch can be in a range of −10° to +10°, etc.).

As another example, embodiments of the apparatus for transient heating can also include a control system positioned to control operation of the burner to switch operational modes of the first burner element and the second burner element of the burner from between an active mode of operation and a passive mode of operation. The control system can have a feedback control loop defined to select between the active mode of operation and the passive mode for the first burner element and the second burner element based on sensor data from sensors positioned in the apparatus or positioned to detect one or more conditions in the apparatus.

A method of operating an apparatus for transient heating is also provided. Embodiments of the method can include positioning at least one burner on a wall of the apparatus for transient heating above a bath of the apparatus for transient heating. Each of the at least one burner can be an embodiment of an above discussed burner. For example, each burner can include a first burner element having a first outer oxidant flow outlet that surrounds a first inner fuel outlet, a second burner element having a second outer oxidant flow outlet that surrounds a second inner fuel outlet where the second burner element is positioned above the first burner element, and an upper oxidant flow nozzle positioned above the second burner element.

Embodiments of the method can include other steps. For example, the method can also include starting up the at least one burner so that the first burner element and the second burner element are in an active mode such that the first and second burner elements operate at an equivalence ratio of between 1.05 and 1.5. As another example, after the apparatus for transient heating is operating at a pre-selected operational temperature that is above an auto-ignition temperature of fuel fed to the at least one burner, the first burner element can be switched from an active mode to a passive mode. Thereafter, the first burner element can be switched from the passive mode to the active mode while the second burner element is switched from the active mode to the passive mode after a first pre-selected time period. The active mode can be a mode at which an equivalency ratio is between 1.4 and 3.0 and the passive mode can be a mode at which the equivalency ratio is between 0.1 and 1.0.

Embodiments of the method can also include operating the at least one burner such that: (1) oxidant output from an oxidant flow outlet of the upper oxidant flow nozzle is between 5% and 40% by volume of an overall oxidant flow rate from the burner and (2) oxidant output from the first burner element is at a flow rate that is within 10% of an oxidant flow rate of oxidant output from the second burner element.

Embodiments of a burner for a transient heating apparatus are also provided. Embodiments of the burner can include embodiments of the above discussed burner. For example, the burner can include a first burner element having a first outer oxidant flow outlet that surrounds a first inner fuel outlet, a second burner element having a second outer oxidant flow outlet that surrounds a second inner fuel outlet where the second burner element is positioned above the first burner element, and an upper oxidant flow nozzle positioned above the second burner element. Embodiments of the burner can also include the other elements and features as discussed above.

For example, a burner for transient heating of a furnace can include a burner face configured to be positionable at an inner surface of the furnace when the burner is mounted in the furnace. The burner face can define a burner face plane. The burner can also include a first burner element having a first annular nozzle configured to flow primary oxidant surrounding a first inner nozzle configured to flow fuel and a second burner element having a second annular nozzle configured to flow primary oxidant surrounding a second inner nozzle configured to flow fuel. The second burner element can be positioned adjacent to and spaced apart from the first burner element. A staging nozzle can be configured to flow secondary oxidant. The staging nozzle can be positioned adjacent to and spaced apart from the second burner element such that the second burner element can be positioned between the staging nozzle and the first burner element. The first inner nozzle and the second inner nozzle can each have a major axis defined by a major axis length L measured at the burner face plane, a minor axis defined by a minor axis height hf measured at the burner face plane, and a fuel nozzle aspect ratio of $5<=L/hf<=15$. The staging nozzle can have a major axis defined by a major axis length X measured at the burner face plane and a minor axis defined by a minor axis height Y measure at the burner face plane. The major axis of the first inner nozzle, the major axis of the second inner nozzle, and the major axis of the staging nozzle can be substantially parallel with each other to within a deviation of less than or equal to 5°.

The different dimensions of the first and second burner elements and the staging nozzle can be adapted to meet a pre-selected set of design criteria. For instance, the length and height for the staging nozzle can be selected so that the staging nozzle has an aspect ratio of $10<=X/Y<=40$. The burner elements and the staging nozzle can also be sized and configured so that $1<=X/L<=2.5$.

The burner elements and the staging nozzle can also be spaced apart from each other to meet a pre-selected design criterial. For instance, second burner element can be spaced apart from the first burner element by a distance H1 wherein $2<=H1/hf<=20$ and the staging nozzle can be spaced apart from the second burner element by distance H2 wherein $2<=H2/hf<=20$. The burner can also include a pilot flame port positioned adjacent to and spaced apart from the first burner element by a distance of H3 wherein $2<=H3/hf<=20$.

The burner elements can also have other spatial design criteria. For example, the minor axis of the first inner nozzle can also be offset from the minor axis of the second inner nozzle by a distance B, wherein $0<B/L<=1.5$. The minor axis of the first inner nozzle and the minor axis of the second inner nozzle can be substantially parallel to each other to within a deviation of less than or equal to 5°.

As yet another example of the spatial and sizing design criteria that can be utilized for the burner, the burner can also include a pilot flame port as noted above. The pilot flame port can be positioned below the first burner element. A top of the pilot flame port can be vertically spaced from a bottom of the first annular nozzle by a third vertical spacing H3 such that $2<=H3/hf<=20$. A bottom of the second burner element can be spaced apart from a top of the first annular nozzle by a first vertical distance H1 wherein $2<=H1/hf<=20$. A bottom of the staging nozzle can be spaced apart from a top of the second annular nozzle by a second vertical distance H2 wherein $2<=H2/hf<=20$. The minor axis of the first inner nozzle can also be offset from the minor axis of the second inner nozzle by a distance B wherein $0<B/L<=1.5$. The minor axis of the first inner nozzle and the minor axis of the second inner nozzle can be substantially parallel to each other to within a deviation of less than or equal to 5°.

The burner can also include fuel conduits that can supply fuel to the first and second inner nozzles of the first and second burner elements. For example, there can be a first fuel conduit configured to supply fuel to the first inner nozzle. The first fuel conduit can have a longitudinal axis aligned with a direction of fuel flow in the first fuel conduit. The longitudinal axis can intersect the burner face plane at an angle α with respect to perpendicular and at a complementary angle (90°−α) with respect to the major axis of the first inner nozzle. A second fuel conduit can be configured to supply fuel to the second inner nozzle. The second fuel conduit can have a longitudinal axis aligned with a direction of fuel flow in the second fuel conduit. The longitudinal axis of the second fuel conduit can intersect the burner face plane at an angle α with respect to perpendicular and at a complementary angle (90°−α) with respect to the major axis of the second inner nozzle. The longitudinal axis of the first fuel conduit and the longitudinal axis of the second fuel conduit can be angled with respect to each other by an angle of 2α or other pre-selected angle value. In some configurations, the angle α can be in a range of $0<α<=20°$ or $5°<α<=20°$.

The first fuel conduit configured to supply fuel to the first inner nozzle having a longitudinal axis aligned with a direction of fuel flow in the first fuel conduit can also be structured so that the longitudinal axis intersects the burner face plane at an angle β with respect to perpendicular and at a complementary angle (90°−β) with respect to the minor axis of the first inner nozzle. Such a configuration can provide a pitch to the first fuel conduit, for example. The second fuel conduit configured to supply fuel to the second inner nozzle having a longitudinal axis aligned with the direction of fuel flow in the second fuel conduit can also be structured such that the longitudinal axis intersects the burner face plane at an angle β with respect to perpendicular and at a complementary angle (90°–β) with respect to the minor axis of the second inner nozzle. In such configurations, the longitudinal axis of the first fuel conduit and the longitudinal axis of the second fuel conduit can each be angled away from the staging nozzle and the angle β can be in a range of $0<\beta<=10°$ or $0<\beta<=5°$.

A total fuel flow and a total oxidant flow can be provided to the burner in an equivalence ratio wherein an equivalence ratio of 1 denotes a stoichiometric ratio of fuel to oxidant, an equivalence ratio of greater than 1 denotes a fuel-rich stoichiometry, and an equivalence ratio of less than 1 denotes a fuel-lean stoichiometry. A controller can be programmed to independently control fuel flow to each of the first inner nozzle and the second inner nozzle and to control distribution of the total oxidant flow to consist of a primary oxidant flow apportioned between the first annular nozzle and the second annular nozzle and a secondary oxidant flow provided to the staging nozzle such that the primary oxidant flow is from 60% to 95% of the total oxidant flow and the secondary oxidant flow is a remainder of the total oxidant flow (e.g. from 5% to 40% of the total oxidant flow). The primary oxidant flow can be apportioned between the first annular nozzle and the second annular nozzle in a ratio from 0.9 to 1.1 as well.

The controller can also be programmed to operate the burner in a proportional mode in which the total fuel flow is supplied to the first inner nozzle and the second inner nozzle such that the equivalence ratio of the first burner element is from 1.05 to 1.5 and the equivalence ratio of the second burner element is from 1.05 to 1.5.

The controller can be programmed to operate the burner in an alternating mode. For instance, the controller can be programmed to operate the burner in an alternating mode in which apportionment of the total fuel flow between the first inner nozzle and the second inner nozzle switches back and forth between a first state in which the first burner element is active while the second burner element is passive and a second state in which the first burner element is passive while the first burner element is active. An active burner element can be characterized by an equivalence ratio from 1.4 to 3 and the passive burner element can be characterized by an equivalence ratio from 0.1 to 1. The controller can be programmed to switch between the first state and the second state based on one or more of passage of a predetermined time period and data from at least one sensor positioned to detect at least one condition in the furnace.

The first annular nozzle and the second annular nozzle can each have a major axis and a minor axis coincident with the major axis and the minor axis of the first inner nozzle and the second inner nozzle, respectively. The minor axis of each of the first annular nozzle and the second annular nozzle can be defined by a height ho. Fuel can exits each of the first inner nozzle and the second inner nozzle at a fuel velocity, primary oxidant can exit each of the first annular nozzle and the second annular nozzle at a primary oxidant velocity, and the ratio ho/hf can be sized to yield a ratio of the fuel velocity to the primary oxidant velocity from 1 to 4.

A furnace is also provided. The furnace can include a wall, a roof, a bath of solid and/or liquid material, and an embodiment of the burner positioned in the wall so that the first burner element is closer to bath than the second burner element and the staging nozzle is closer to the roof than the second burner element. The embodiment of the burner utilized in the furnace can be any of the embodiments discussed herein, for example.

A method of operating a burner in a furnace is also provided. The method can include flowing a total oxidant flow to the burner consisting of a primary oxidant flow apportioned between the first annular nozzle and the second annular nozzle and a secondary oxidant flow provided to the staging nozzle wherein the primary oxidant flow is from 60% to 95% of the total oxidant flow, and wherein the primary oxidant flow apportioned between the first annular nozzle and the second annular nozzle in a ratio from 0.9 to 1.1. The secondary oxidant flow can be 40% to 5% of the total oxidant flow. The method can also include flowing a total fuel flow to the burner.

The method can also include switching operation of the burner between a proportional mode and an alternating mode. When in the proportional mode, the total fuel flow can be apportioned between the first inner nozzle and the second inner nozzle such that the equivalence ratio of the first burner element is from 1.05 to 1.5 and the equivalence ratio of the second burner element is from 1.05 to 1.5. When in an alternating mode, the total fuel flow apportioned between the first inner nozzle and the second inner nozzle can switch back and forth between a first state in which the first burner element is active while the second burner element is passive and a second state in which the first burner element is passive while the second burner element is active and wherein an active burner element is characterized by an equivalence ratio from 1.4 to 3 and a passive burner element is characterized by an equivalence ratio from 0.1 to 1. In such embodiments of the method, an equivalence ratio of 1 denotes a stoichiometric ratio of fuel to oxidant, an equivalence ratio of greater than 1 denotes a fuel-rich stoichiometry, and an equivalence ratio of less than 1 denotes a fuel-lean stoichiometry.

Other details, objects, and advantages of methods of transient heating, apparatuses for transient heating, burners for reverberatory furnaces, and methods of making and using the same will become apparent as the following description of certain exemplary embodiments thereof proceeds.

BRIEF DESCRIPTION OF THE DRAWINGS

Exemplary embodiments of burners for transient heating and methods of making and using the same are shown in the drawings. Like reference characters in the drawings identify like components.

DETAILED DESCRIPTION

Figure 1:
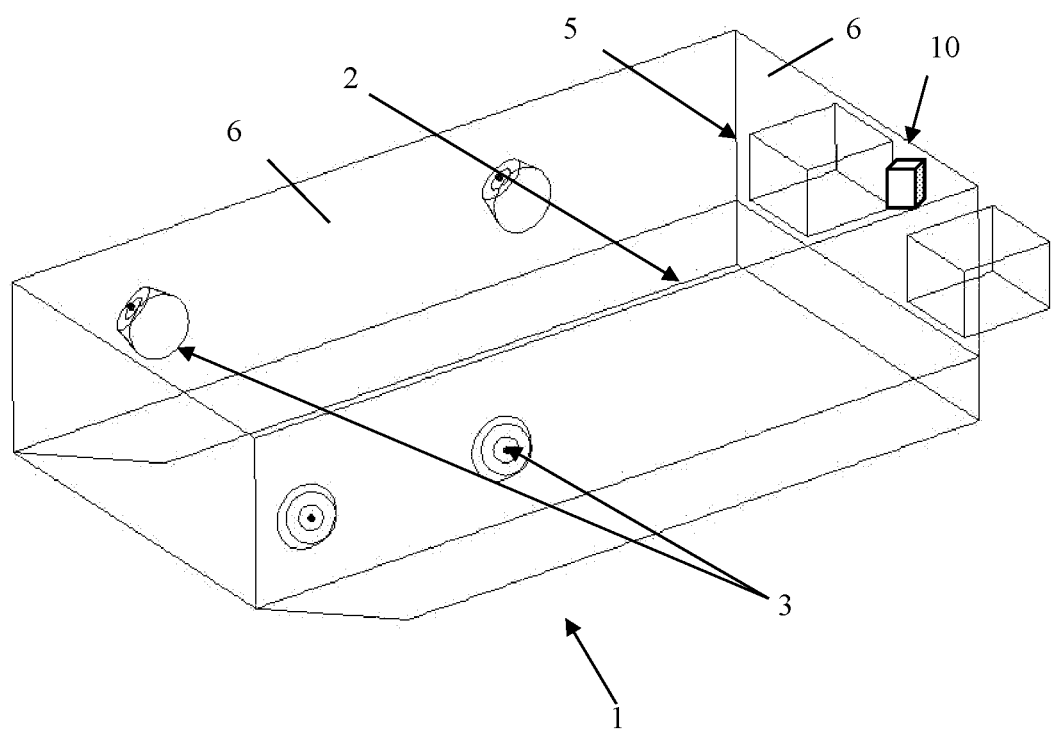
FIG. 1 is a schematic perspective view of a reverberatory furnace 1 into which a transient heating burner 10 is mounted in a sidewall 6.
Figure 2:
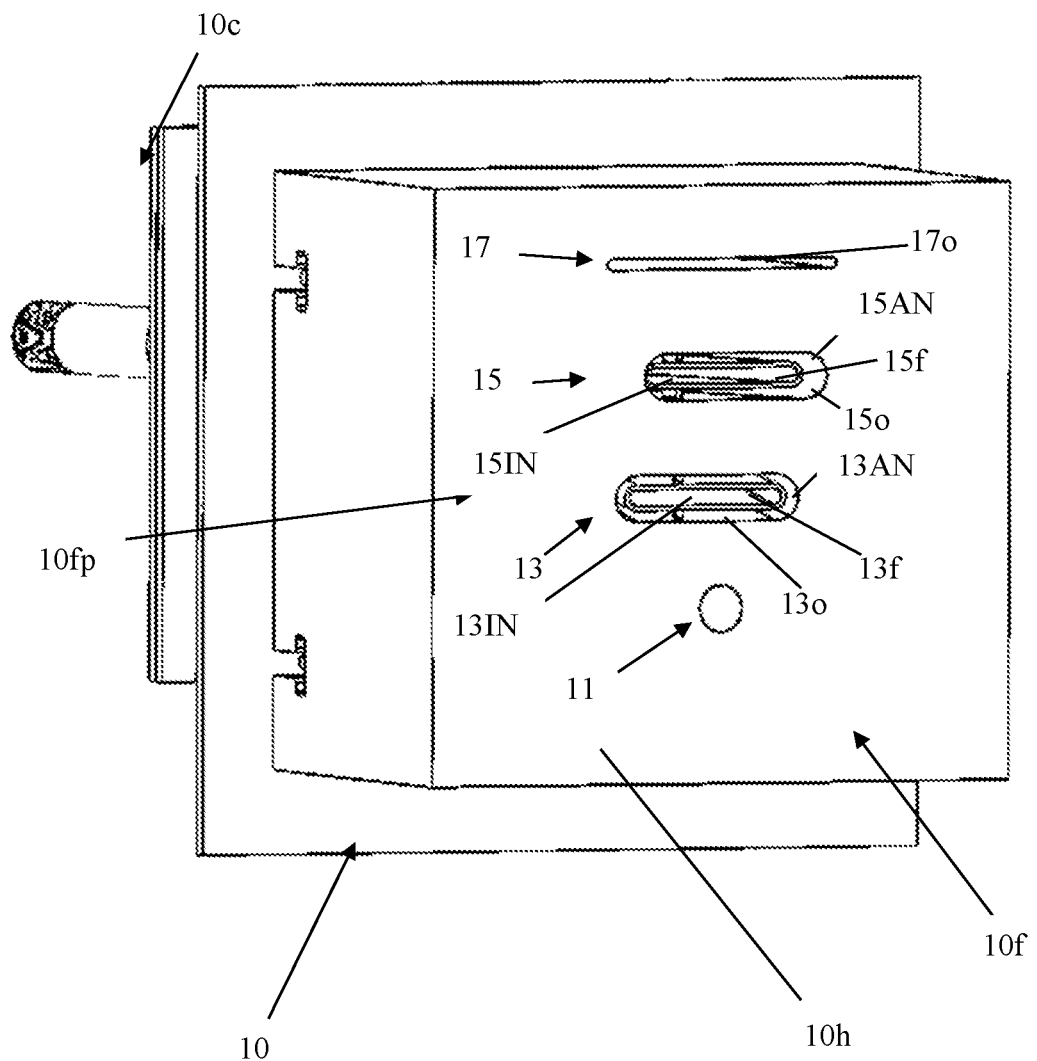
FIG. 2 is a front perspective view of a first exemplary embodiment of a transient heating burner 10.

As may best be seen from FIGS. 2-9, a transient heating burner 10 can include a plurality of burner elements and positioned between a lower pilot flame port 11 that can output a pilot flame and a staging nozzle 17 that can output a flow of oxidant from an oxidant flow outlet 17o defined in a hot side 10h of the body of the burner 10. The hot side 10h of the body of the burner 10 can be positioned to face toward the inside of the chamber of the apparatus for transient heating above the bath 2. The staging nozzle 17 can also be referred to as an upper oxidant flow nozzle 17 for some embodiments.

The plurality of burner elements can include a first burner element 13 that is spaced apparat from an upper second burner element 15. The first lower burner element 13 can be between the lower pilot flame port 11 and the second burner element 15. The second burner element 15 can be positioned between the first burner element 13 and the staging nozzle 17 (e.g. upper oxidant flow nozzle 17).

The lower first burner element 13 can include have a first inner nozzle 13IN that has a first inner fuel outlet 13f that can output a flow of fuel into the chamber above the bath 2 and below the second upper burner element 15. The first inner fuel outlet 13f of the first inner nozzle 13IN can be surrounded by a first outer oxidant flow outlet 13o of the first annular nozzle 13AN of the first burner element 13 (e.g. a perimeter of the first inner fuel outlet 13f can be entirely surrounded or encircled by the first outer oxidant flow outlet 13o). The first outer oxidant flow outlet 13o can output a flow of oxidant into the chamber above the bath 2. The fuel output from the inner fuel outlet 13f of the first burner element 13 can be within a pre-selected first burner element fuel flow rate range and the oxidant flow output from the first outer oxidant flow outlet 13o can be within a pre-selected first burner element oxidant flow rate range. The oxidant flow output from the first outer oxidant flow outlet 13o can have a pre-selected oxygen concentration that is within a pre-selected first burner element oxidant flow oxygen concentration range. The oxygen concentration for the oxidant flow output from the first outer oxidant flow outlet 13o can be 90 volume percent (vol %) oxygen to 100 vol % oxygen in some embodiments. Other embodiments can utilize an oxygen concentration of between 21 vol % to 100 vol % oxygen. Yet other embodiments can utilize an oxygen concentration of less than 21 vol % oxygen and more than 10 vol % oxygen or a concentration of at least 26 vol % oxygen, at least 40 vol % oxygen, at least 70 vol % oxygen, or at least 98 vol % oxygen.

The second burner element 15 can include a second inner nozzle 15IN that is positioned inside of a second annular nozzle 15AN (e.g. the second annular nozzle can surround the second inner nozzle). For example, the second inner nozzle 15IN can have a second inner fuel outlet 15f that can output a flow of fuel into the chamber above the bath. The second inner fuel outlet 15f of the second burner element 15 can be surrounded by the second annular nozzle 15AN of the second burner element 15, which can be configured to have a second outer oxidant flow outlet 15o. The second annular nozzle 15AN can output a flow of oxidant into the chamber above the bath 2 (e.g. a perimeter of the second inner fuel outlet 15f can be entirely surrounded or encircled by the second outer oxidant flow outlet 15o). The fuel output from the inner fuel outlet 15f of the second burner element 15 can be within a pre-selected second burner element fuel flow rate range and the oxidant flow output from the second outer oxidant flow outlet 15o can be within a pre-selected second burner element flow rate range. The oxidant flow output from the second outer oxidant flow outlet 15o can have a pre-selected oxygen concentration that is within a pre-selected second burner element oxidant flow oxygen concentration range. The oxygen concentration for the oxidant flow output from the second outer oxidant flow outlet 15o can be 90 volume percent (vol %) oxygen to 100 vol % oxygen in some embodiments. Other embodiments can utilize an oxygen concentration of between 21 vol % to 100 vol % oxygen. Yet other embodiments can utilize an oxygen concentration of less than 21 vol % oxygen and more than 10 vol % oxygen or a concentration of at least 26 vol % oxygen, at least 40 vol % oxygen, at least 70 vol % oxygen, or at least 98 vol % oxygen.

The staging nozzle 17 can be configured as an oxidant flow nozzle 17 can include an oxidant flow outlet 17o that outputs a flow of oxidant at a flow rate that can be within a pre-selected upper oxidant flow rate range. The oxidant flow from each of the first oxidant nozzle 13o, the second oxidant nozzle 15o, and the staging nozzle 17 typically have a volumetric concentration of molecular oxygen (O2) from 21 vol % to 100 vol %. More generally, an oxidant may be air, vitiated air (i.e., gas with less than about 20.9% oxygen), oxygen-enriched air (i.e., gas with greater than about 20.9% oxygen), or essentially pure oxygen (i.e., gas with approximately 100% oxygen). In preferred embodiments, the oxidant is an oxygen-enriched air having an oxygen concentration of at least 26 vol % oxygen, at least 40 vol % oxygen, at least 70 vol % oxygen, or at least 98 vol % oxygen.

Figures 3, 4:
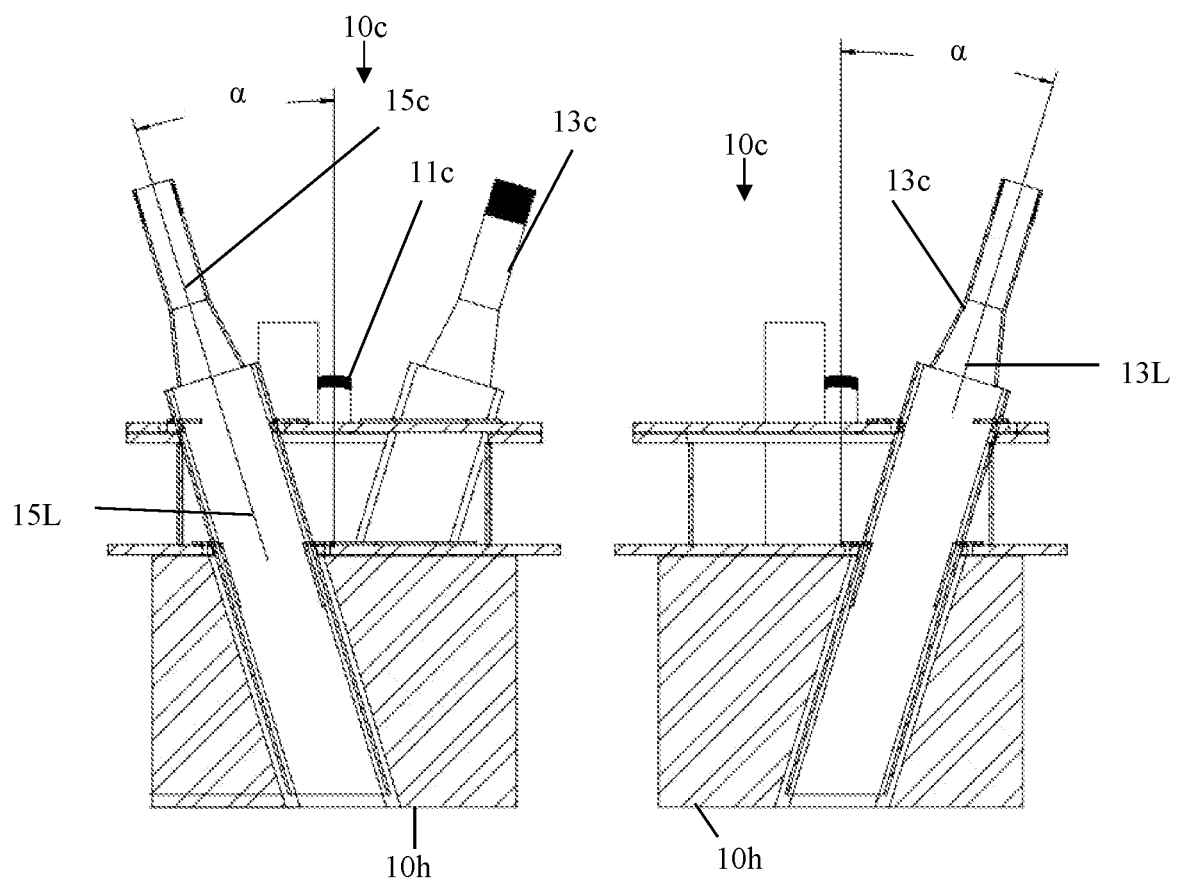
FIG. 3 is schematic top cross-sectional view of the first exemplary embodiment of the burner 10 in FIG. 2.
FIG. 4 is another schematic cross-sectional view of the first exemplary embodiment of the burner 10 in FIG. 2.

Fuel and oxidant are supplied to the burner 10 by conduits extending from the burner face 10h rearwardly through the burner body and outward beyond the rear side 10c, as shown in FIGS. 3 and 4. Oxidant is supplied to the burner through an oxidant conduit that feeds into an oxidant plenum, which serves as a manifold to distribute oxidant to the first annular nozzle 13o, the second annular nozzle 15o, and the staging nozzle 17o. Approximately equal flow rates of oxidant are distributed to each of the first annular nozzle 13o and the second annular nozzle 15o, while the amount of oxidant distributed to the staging nozzle 17o is controlled by a valve (not shown).

Fuel for the first burner element 13 is supplied to a first fuel conduit 13c that defines a longitudinal axis 13L extending through the first inner nozzle 13f. Fuel for the second burner element 15 is supplied to a second fuel conduit 15c that defines a longitudinal axis 15L extending through the second inner nozzle 15f.

Figure 5:
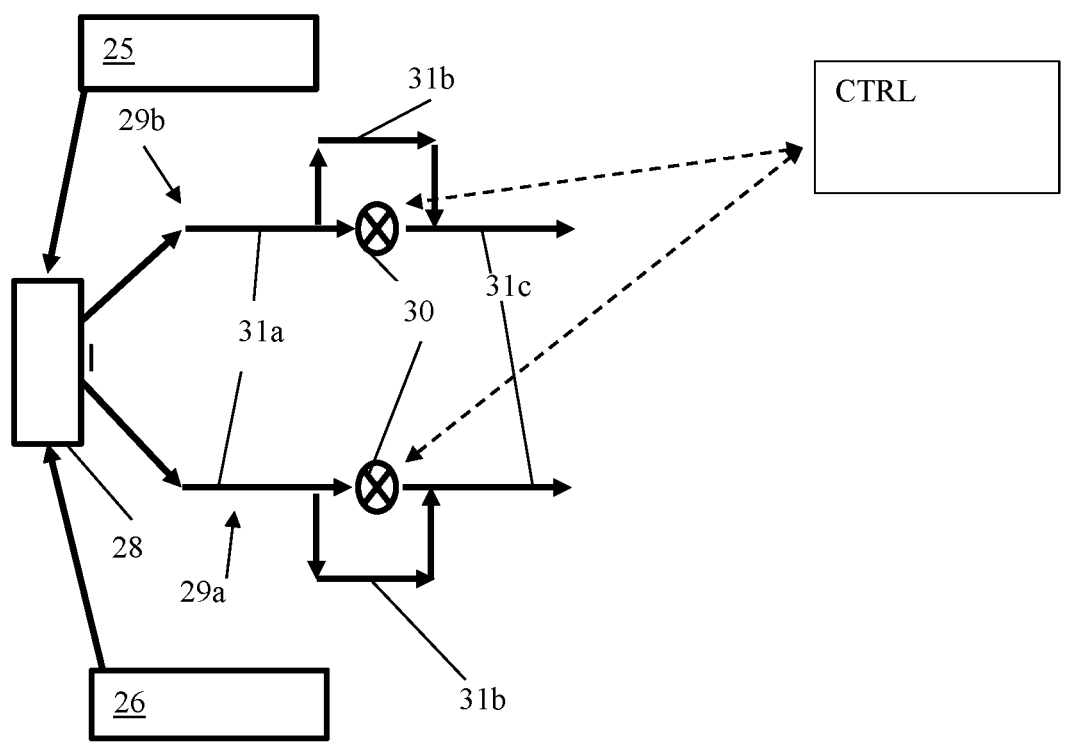
FIG. 5 is a schematic illustration of an exemplary fuel conduit arrangement for feeding fuel to the first and second burner elements 13 and 15 of the first exemplary embodiment of the burner 10.

Fuel is supplied to the burner elements 13 and 15 by a flow control arrangement as shown in FIG. 5. A fuel supply source 28 provides fuel to a first flow train having a valve 30 and a bypass 31*b* that circumvents the valve 30, and to a second flow train having a valve 30 and a bypass 31*b* that circumvents the valve 30.

The first flow train supplies fuel to the first inner nozzle 13*f* of the first burner element 13 while the second flow train supplies fuel to the second inner nozzle 15*f* of the second burner element 15, as shown in FIGS. 6A and 6B.

When the valve 30 of the first flow train is open and fuel flows through both the valve 30 and its corresponding bypass 31*b* of the first flow train, the fuel flow to the first inner nozzle 13*f* is greater than when the valve 30 is closed and fuel flows only through the bypass 31*b*. Similarly, when the valve 30 of the second flow train is open and fuel flows through both the valve 30 and the bypass 31*b* of the second flow train, the fuel flow to the second inner nozzle 15*f* is greater than when the valve 30 is closed and fuel flows only through the bypass 31*b*.

The two valves 30 are controlled by a controller CTRL programmed to operate the burner 10 in such a way that at least one of the valves 30 is always open, and sometimes both valves 30 are open. When the valve 30 of the first flow train is open and the valve 30 of the second flow train is closed, the first burner element 13 is in an active mode while the second burner element 15 is in a passive mode; and conversely, when the valve 30 of the first flow train is closed and the valve 30 of the second flow train is open, the first burner element 13 is in a passive mode while the second burner element 15 is in an active mode. When both the valves 30 are open, both burner elements 13 and 15 are in an active mode. The burner 10 is typically not operated with both the valves 30 closed since this would not be expected to be a useful mode of operation, although if it is later determined to be useful, the controller CTRL can be programmed to include that mode of operation of the burner 10.

Fuel is supplied separately to a pilot conduit 24 that connects to the pilot flame port which is used for ignition purposes and for when the furnace is below the auto-ignition temperature of the fuel.

A cooler side 10*c* of the burner 10 can be opposite the hot side 10*h*. As may best be appreciated from FIGS. 3-5, the cooler side 10*c* of the burner 10 can include an arrangement of conduits through which fuel and oxidant flows can be transported to the lower pilot flame port 11, first and second burner elements 13 and 15 and the staging nozzle 17 (which can be considered an upper oxidant flow nozzle 17 for the illustrated embodiment). For example, fuel can be output from a fuel control manifold 28 for feeding fuel to a first burner element fuel feed conduit 29*a* and a second burner element fuel feed conduit 29*b* for feeding fuel to the first and second inner nozzles of the first and second burner elements 13 and 15 of the burner.

The oxidant flows can be fed to the first burner element 13, second burner element 15, and staging nozzle 17 (e.g. upper oxidant flow nozzle 17) via oxygen supply conduits that provide oxygen containing oxidant fluid from a source of oxygen to the first annular nozzle 13AN of the first burner element 13, second annular nozzle 15AN of the second burner element 15, and staging nozzle 17 so oxidant flows can be output from the first outer oxidant flow outlet 13*o*, second outer oxidant flow outlet 15*o*, and staging nozzle 17. Examples of the source of oxygen can be a cryogenic air separation unit that outputs one or more oxygen flows that can be fed to the nozzles or a Vacuum Swing Adsorption (VSA) unit that can output at least one flow of oxygen. Other sources of oxidant for the oxidant flows can be other plant units that may provide a flow of oxidant to the burner (e.g. a compressor for feeding air as an oxidant flow, a compressor for feeding oxygen enriched air as an oxidant flow, etc.).

The burner 10 is capable of operating on any gaseous fuel, including but not limited to natural gas (i.e., primarily methane), hydrogen, or a blend of natural gas and hydrogen in any desired ratio. In some embodiments, the fuel that is provided by the fuel control manifold 28 can include natural gas, hydrogen, or a mixture of hydrogen and natural gas. For example a source of hydrogen 26 and a source of natural gas 25 can be connected to the fuel control manifold 28 via feed conduits to feed hydrogen and/or natural gas to the fuel control manifold 28. The fuel control manifold can be configured to retain the fuel and/or mix the fuel (e.g. mix the hydrogen with the natural gas when both are fed to the fuel control manifold to provide a fuel that includes hydrogen and natural gas as the fuel) and feed the fuel to one or more fuel feed conduits via an arrangement of valves and one or more vessels. The fuel control manifold 28 can be connected to the first and second burner elements 13 and 15 of the burner 10 via fuel feed conduits (e.g. first burner element fuel feed conduit 29*a*, second burner element fuel feed conduit 29*b*, etc.) to feed the fuel so the fuel is outputtable via the inner fuel opening of each burner element's inner nozzle.

The first burner element feed conduit 29*a* and the second burner element fuel feed conduit 29*b* can each include a conduit arrangement and a control valve 30 so at least a minimum amount of fuel is fed to the inner fuel nozzle opening to which the feed conduit is connected. For example fuel received from the fuel control manifold 28 can be passed to a downstream fuel feed conduit segment 31*a* of a burner element feed conduit so the fuel can be passed along a bypass flow conduit segment 31*b* and/or pass through a control valve 30 to a downstream conduit segment 31*c* connected to an inner fuel nozzle opening for outputting the fuel into the chamber above the bath 2. The downstream fuel feed conduit segment 31*a* can be positioned between the control valve 30 and the fuel control manifold 28 so it is upstream of the control valve 30 and downstream of the fuel control manifold 28. The bypass flow conduit segment 31*b* can be positioned between the upstream fuel feed conduit segment 31*a* and the downstream fuel feed conduit segment 31*c* so fuel from the upstream fuel feed conduit segment 31*a* can pass to the downstream conduit segment 31*c* without having to flow through the control valve 30. The downstream conduit segment 31*c* can be positioned between the inner nozzle of the burner element to which the fuel feed conduit is connected and the control valve 30. The downstream conduit segment 31*c* can also be positioned between the inner nozzle to which the fuel feed conduit is connected and the outlet of the bypass flow conduit segment 31*b*.

To increase flame coverage of the furnace, the first burner element 13 may be angled in one or both directions, i.e., with respect to its major axis and/or with respect to its minor axis. Similarly, the second burner element 15 may be angled in one or both directions, i.e., with respect to its major axis and/or with respect to its minor axis.

As may best be appreciated from FIGS. 3 and 4, the first burner element 13 and second burner element 15 can be aligned so that the flow of fuel output from each of the first and second inner nozzles of these burner elements is at a horizontal angle $\alpha$ relative to a centered, straight angle (e.g. an angle of 0° relative to the face of the wall on which the burner is mounted, or the angle at which the pilot flame outputs fuel for that flame via the pilot flame port 11). The horizontal angle $\alpha$ can be in a range of +/−5° to +/−20°.

The low and high limits of the horizontal angle α can be defined or determined so that the fuel is fully combusted before it leaves the furnace. If the included angle is too large, the fuel and oxidizer wouldn't mix properly within the furnace volume. If the angle is too low, the two flames may not adequately cover the furnace width leaving cold spots in the furnace. The final angle between the nozzles can be determined by the furnace width. Additionally, furnace width is another parameter that determines this included horizontal angle α. The width can affect the desired horizontal angle α because it is desired to prevent flame output from the nozzle from impinging the furnace wall.

For example, the feed conduit 15c for the second inner fuel outlet 15f of the second burner element 15 can extend linearly from the second burner element fuel feed conduit 29b to the second inner fuel outlet 15f of the second burner element 15 at a horizontal angle α relative to the horizontal direction at which the pilot flame feed conduit 11c extends linearly to the pilot flame port 11. This horizontal angle can be considered a first pre-selected horizontal angle or a pre-selected horizontal angle of the second burner element 15. It should be appreciated that at least a portion of the feed conduit 15c can include downstream conduit segment 31c or entirely be this segment.

The horizontal angle α can for the second burner element 15 can also be considered to be an angle α at which the longitudinal axis 15L of the feed conduit 15c for the second burner element 15 intersects the burner face place 10fp with respect to perpendicular and at a complementary angle (90°−α) with respect to the major axis of the second inner nozzle 15IN of the second burner element 15 (e.g. the length L of the second inner fuel outlet 15f). The angle α can be greater than 0° and less than or equal to 20° or less than 0° and greater than or equal to −20° in some embodiments.

As another example, the feed conduit 13c for the first inner fuel outlet 13f of the first burner element 13 can extend linearly from the first burner element fuel feed conduit 29a to the first inner fuel outlet 13f of the first burner element 13 at a horizontal angle α relative to the horizontal direction at which the pilot flame feed conduit 11c extends linearly to the pilot flame port 11. This horizontal angle can be considered a second pre-selected horizontal angle or a pre-selected horizontal angle of the first burner element 13. The horizontal angle α can be in a range of +/−5° to +/−20°. It should be appreciated that at least a portion of the feed conduit 15c can include downstream conduit segment 31c or entirely be this segment.

The horizontal angle α can for the first burner element 13 can also be considered to be an angle α at which the longitudinal axis 13L of the feed conduit 13c for the first burner element 13 intersects the burner face place 10fp with respect to perpendicular and at a complementary angle (90°−α) with respect to the major axis of the first inner nozzle 13IN of the first burner element 13 (e.g. the length L of the first inner fuel outlet 13f). The angle α can be greater than 0° and less than or equal to 20° in some embodiments or less than 0° and greater than or equal to −20° in some embodiments.

The longitudinal axis 15L of the feed conduit 15c for the second burner element 15 can be an axis that extends in a direction of fuel flow, which can be the direction at which fuel is passed through the feed conduit 15c for being output from the second inner fuel outlet 15f of the second inner nozzle 15IN. Also, the longitudinal axis 13L of the feed conduit 13c for the first burner element 13 can be an axis that extends in a direction of fuel flow, which can be the direction at which fuel is passed through the feed conduit 13c for being output from the first inner fuel outlet 13f of the first inner nozzle 13IN. In such an arrangement, the longitudinal axes 13L and 15L can be aligned with the direction of fuel flow for the fuel passed through the feed conduits 13c and 15c for being output from the first and second inner nozzles 13IN and 15IN.

As may be appreciated from FIGS. 3 and 4, in some embodiments, the horizontal angle α at which the feed conduit 15c for the second inner fuel outlet 15f extends linearly along can be in a range of −5° to −20° and the horizontal angle α at which the feed conduit 13c for the first inner fuel outlet 13f extends linearly along can be in a range of 5° to 20°. In other embodiments, the horizontal angle α at which the feed conduit 15c for the second inner fuel outlet 15f extends linearly along can be in a range of 5° to 20° and the horizontal angle α at which the feed conduit 13c for the first inner fuel outlet 13f extends linearly along can be in a range of −5° to −20°.

It should be appreciated that the value of the horizontal angle α can be the same nominal value for the first and second burner elements 13 and 15 (e.g. when the angle α is 5° and −5° for the burner elements, the same nominal value for the angle α is 5°, etc.). In such embodiments, the longitudinal axis 13L of the feed conduit 13c for the first burner element 13 can be angled with respect to the longitudinal axis 15L of the feed conduit 15c for the second burner element 13 by an angle that is double the nominal value of the angle α (e.g. is 2α, or 2*α).

The feed conduit 15c for the second inner fuel outlet 15f can be positioned to extend linearly so the conduit 15c is in a level orientation (e.g. has no pitch) as it extends from the second nozzle fuel feed conduit 29b to the second inner fuel outlet 15f. Alternatively, the feed conduit 15c for the second inner fuel outlet 15f can be positioned to extend linearly along a vertical angle (e.g. have a pitch of up to +/−10° relative to level). The vertical angle α which the feed conduit 15c for the second inner fuel outlet 15f can extend along can be considered a pitch. The pitch can also be referred to as an angle β that is an angle at which the longitudinal axis 15L of the feed conduit 15c can intersect a plane defined by the major axis and minor axis of the second inner nozzle 15IN of the second burner element (e.g. a plane defined by the length L and height hf of the second inner fuel outlet 15f) with respect to perpendicular and at a complementary angle (90°−β) with respect to the minor axis of the second inner nozzle 15IN (e.g. the height hf of the second inner fuel outlet 15f). The pitch (or angle β) can be up to +10° relative to a level orientation that has no vertical component of direction or up to −10° relative to a level orientation that has no vertical component of direction so the conduit 15c extends linearly along the vertical pitch in a range of −10° to +10°.

The feed conduit 13c for the first inner fuel outlet 13f can also be positioned to extend linearly so the conduit 13c is in a level orientation (e.g. has no pitch) as it extends from the first nozzle fuel feed conduit 29a to the first inner fuel outlet 13f. Alternatively, the feed conduit 13c for the first inner fuel outlet 13f can be positioned to extend linearly along a vertical angle (e.g. have a pitch of up to +/−10° relative to level). The vertical angle at which the feed conduit 13c for the first inner fuel outlet 13f can extend along can be considered a pitch. The pitch can also be referred to as an angle β that is an angle at which the longitudinal axis 13L of the feed conduit 13c can intersect a plane defined by the major axis and minor axis of the first inner nozzle 13IN of the first burner element (e.g. a plane defined by the length L and height hf of the first inner fuel outlet 13f) with respect to perpendicular and at a complementary angle (90°−β) with respect to the minor axis of the first inner nozzle 13IN (e.g. the height hf of the first inner fuel outlet 13f). The pitch (or angle β) can be up to +10° relative to a level orientation that has no vertical component of direction or up to −10° relative to a level orientation that has no vertical component of direction so the conduit 13c extends linearly along the vertical pitch in a range of −10° to +10°. It should be appreciated that a pitch of greater than 0° (e.g. +1° or +10°, etc.) can be considered an inclined direction that can direct fuel upwardly and a pitch of less than 0° (e.g. −1° or −10°, etc.) can be considered a declined direction that can direct fuel downwardly.

In some embodiments, the pitch of the feed conduit 13c for the first inner fuel outlet 13f can be a value that is opposite the pitch of the feed conduit 15c for the second inner fuel outlet 15f For instance, the pitch for the feed conduit 13c for the first inner fuel outlet 13f can range from greater than 0° to +10° and the pitch for the feed conduit 15c for the second inner fuel outlet 15c can range from less than 0° to −10°. As another example, the pitch for the feed conduit 13c for the first inner fuel outlet 13f can range from less than 0° to −10° and the pitch for the feed conduit 15c for the second inner fuel outlet 15c can range from greater than 0° to +10°. In other embodiments, the pitch for both the feed conduits 13c and 15c for the first and second inner fuel outlets 13f and 15f can each have a level orientation with a pitch of 0° or each have the same type of pitch (e.g. both can have a pitch ranging from 0° to +10° or 0° to −10°). In some preferred embodiments, the pitch for the feed conduits 13c and 15c for the first and second inner fuel outlets 13f and 15f are oriented parallel to the bath surface (e.g. have a pitch of 0° or about 0°, which can be a pitch that is within 1° of being 0°).

The longitudinal axis 13L for the feed conduit 13c can be angled away from the staging nozzle 17. The longitudinal axis 15L for the feed conduit 15c can also be angled away from the staging nozzle 17.

The second inner fuel outlet 15f of the second burner element 15 can be recessed relative to the second outer oxidant flow outlet 15o of the second burner element 15. For example, the second oxidant flow outlet 15o of the second burner element 15 can be positioned at the hot side 10h of the burner while the second fuel outlet 15f of the second burner element is recessed 0.25 inches to 0.75 inches away from the hot side 10h of the burner (e.g. is recessed 0.635 cm to 1.905 cm). As another example, the second oxidant flow outlet 15o of the second burner element 15 can be positioned at the hot side 10h of the burner while the second fuel outlet 15f of the second burner element 15 is recessed 0.15 inches to 1.0 inches away from the hot side 10h of the burner (e.g. is recessed 0.381 cm to 2.54 cm). The recessed positioning of the second inner fuel outlet 15f relative to the second outer oxidant flow outlet 15o can help protect the fuel line (e.g. natural gas fuel line, etc.) from any damage due to the corrosive furnace hot gases. This can help to increase the life of the fuel lines before any replacement is required.

The first inner fuel outlet 13f of the first burner element 13 can be recessed relative to the first outer oxidant flow outlet 13o of the first burner element 13. For instance, the first oxidant flow outlet 13o of the first burner element 13 can be positioned at the hot side 10h of the burner while the first fuel outlet 13f of the first burner element 13 is recessed 0.25 inches to 0.75 inches away from the hot side 10h of the burner (e.g. is recessed 0.635 cm to 1.905 cm). As another example, the first oxidant flow outlet 13o of the first burner element 13 can be positioned at the hot side 10h of the burner while the first fuel outlet 13f of the first burner element 13 is recessed 0.15 inches to 1.0 inches away from the hot side 10h of the burner (e.g. is recessed 0.381 cm to 2.54 cm).

In addition to a pitch, horizontal angle α, and recessed arrangement, the nozzle spacing and positioning vertically and horizontally (e.g. vertical spacing along height of wall, horizontal offset positioning, etc.) can be adapted to meet a particular set of design criteria for providing a stable flame that can provide a low NOx emission while also permitting the flame to be generated from a fuel of natural gas, a fuel of hydrogen, or a fuel that is a mixture of hydrogen and natural gas. For example, the horizontal positioning of the first burner element 13 and the second burner element 15 can be adapted to permit these burner elements to be aligned with each other's center or to be offset horizontally within a pre-selected horizontal offset range.

For example, the horizontal length L of the first inner fuel outlet 13f and the horizontal length L of the second inner fuel outlet 15f can each be the same or be similar (e.g. the length L of the first fuel outlet 13f can be 90%-110% of the length L of the second inner fuel outlet 15f). The length L for each outlet can be a length of a major axis of the outlet. For instance, the length L can define the major axis length measured at the burner face plane for the outlet of the first inner nozzle 13IN (e.g. first fuel outlet 13f) of the first burner element 13 and the length L can define the major axis length measured at the burner face plane for the outlet of the second inner nozzle 15IN (e.g. second inner fuel outlet 15f) of the second burner element 15. The major axis of the first inner nozzle 13IN having the first inner fuel outlet 13f can be substantially parallel to the major axis of the second inner nozzle 15IN having the second inner fuel outlet 15f so that these major axes are parallel or are within 5° of being parallel.

The positioning of the upper second fuel outlet 15f and lower first fuel outlet 13f can be arranged so that the center of the first fuel outlet 13f is horizontally spaced from a center of the second fuel outlet 15f by an offset distance B. The offset distance B can be a distance between a minor axis of the first inner nozzle 13IN having the first inner fuel outlet 13f and a minor axis of the second inner nozzle 15IN having the second inner fuel outlet 15f. The minor axes can be defined by the heights of the outlets. The heights of the outlets can extend perpendicular to the lengths L of the outlets. The minor axis of the first inner nozzle 13IN having the first inner fuel outlet 13f can be substantially parallel to the minor axis of the second inner nozzle 15IN having the second inner fuel outlet 15f so that these minor axes are parallel or are within 5° of being parallel.

Figure 6:
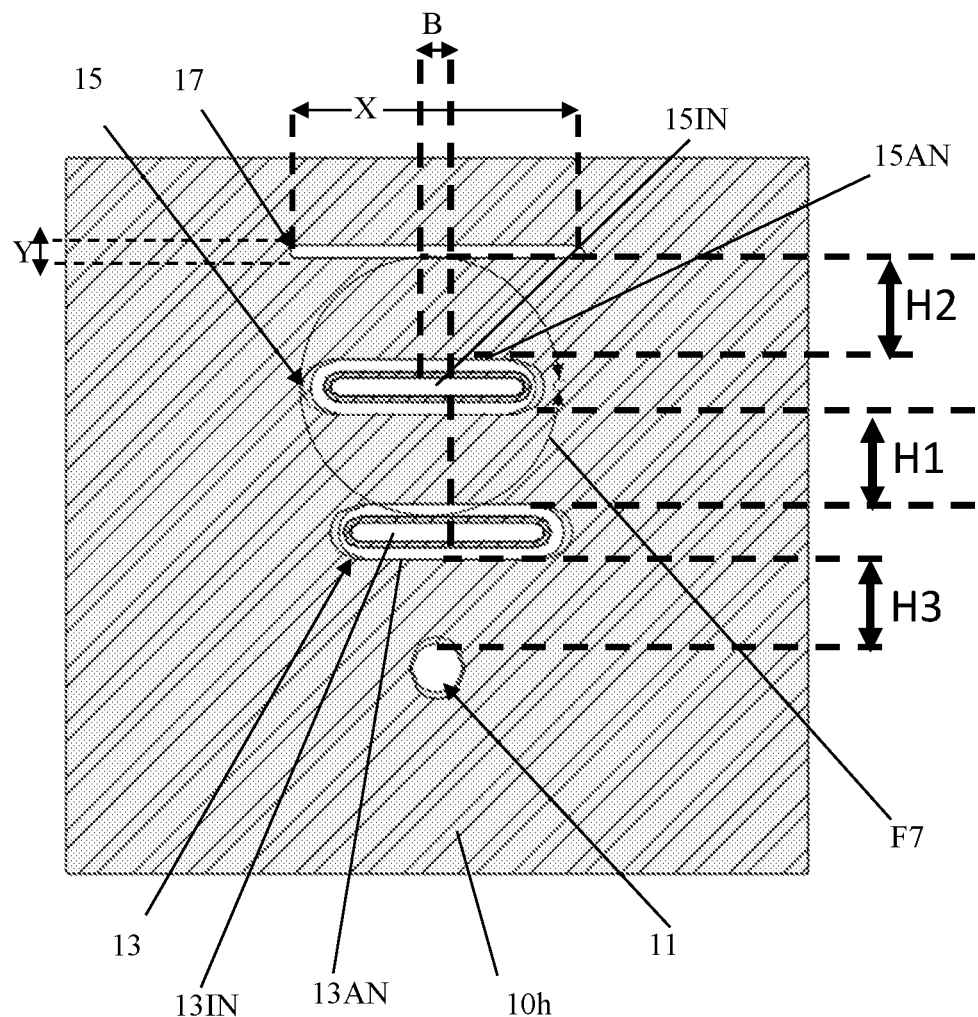
FIG. 6 is a front view of the first exemplary embodiment of the burner 10.
Figure 8:
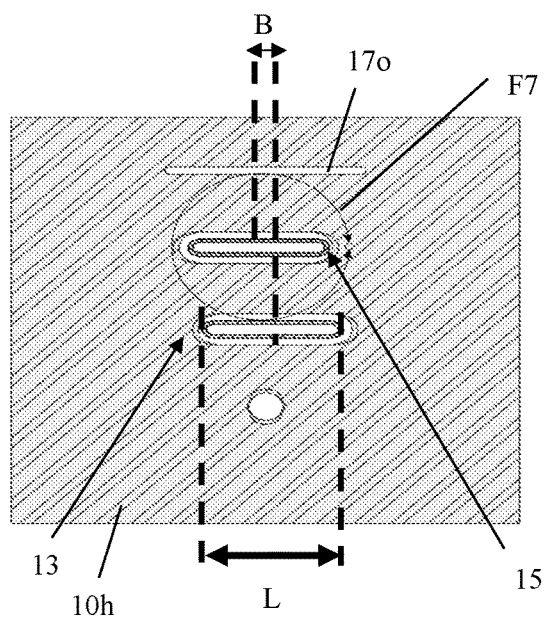
FIG. 8 is a front view of the first exemplary embodiment of the burner 10.
Figure 9:
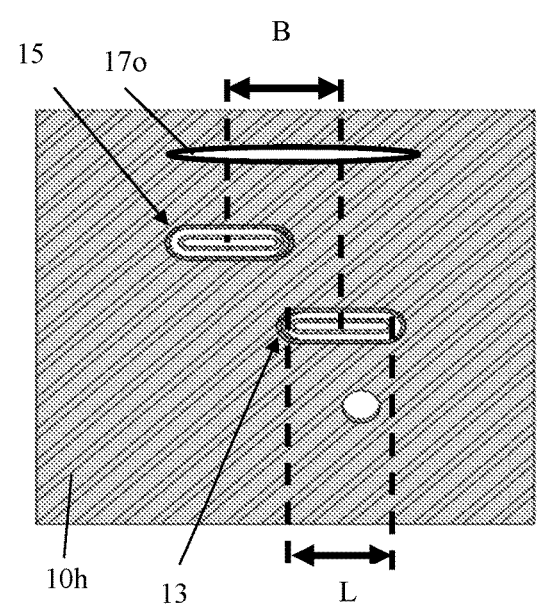
FIG. 9 is a front view of the first exemplary embodiment of the burner 10 similar to the views of FIGS. 6 and 8 and illustrating an example of an alternative orientation of the first and second burner elements 13 and 15.

FIG. 8 and FIG. 9 illustrate examples of different offset distance B arrangements, for example (it should be appreciated that FIG. 6 illustrates an offset distance B arrangement that is similar to that shown in FIG. 8). The overlap feature of the first and second burner elements 13 and 15 can help facilitate the mixing of the fuel and oxidizer within the furnace volume for complete combustion of the fuel before leaving the furnace exit.

Figure 7:
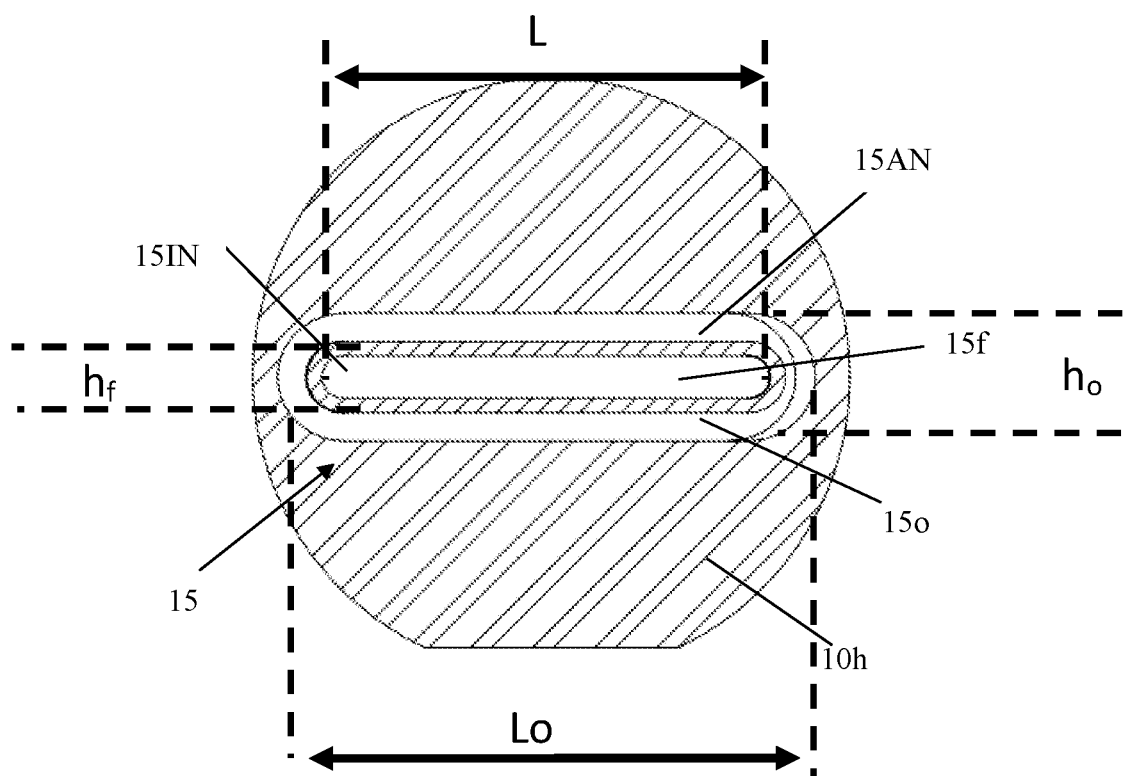
FIG. 7 is an enlarged fragmentary view of the second upper burner element 15 circled in circle F7 in FIGS. 6 and 8.

In FIG. 7, the horizontal length L of the first inner fuel outlet 13f can be less than a horizontal length Lo of the first outer oxidant flow outlet 13o of the first burner element 13. Also, the height hf of the first inner fuel outlet 13f measured at the burner face plane 10fp can be less than a height ho of the first outer oxidant flow outlet 13o of the first burner element 13 measured at the burner face plane 10fp. As discussed above, each of these heights hf and ho can extend along a minor axis of the outlet perpendicular to the major axis of the outlet that defines the length (L or Lo) of the outlet. The first outer oxidant flow outlet 13o of the first burner element 13 can be annular shaped so that the first inner fuel outlet 13f is positioned within a central opening of the first outer oxidant flow outlet 13o.

The horizontal length L of the second inner fuel outlet 15f can be less than a horizontal length Lo of the second outer oxidant flow outlet 15o of the second burner element 15 measured at the burner face plane 10fp. Additionally, the height hf of the second inner fuel outlet 15f can be less than a height ho of the second outer oxidant flow outlet 15o of the second burner element 15 measured at the burner face plane 10fp. As discussed above, each of these heights hf and ho can extend along a minor axis of the outlet perpendicular to the major axis of the outlet that defines the length of the outlet. The second outer oxidant flow outlet 15o of the second burner element 15 can be annular shaped so that the second inner fuel outlet 15f is positioned within a central opening of the second outer oxidant flow outlet 15o.

The size and shape of the first burner element 13 can be the same as the size and shape of the second burner element 15. For example, the size and shape of the second inner fuel outlet 15f a can be the same as the size and shape of the first inner fuel outlet 13f and the size and shape of the first outer oxidant flow outlet 13o can be the same as the size and shape of the second outer oxidant flow outlet 15o.

The oxidant flow outlet 17o of the staging nozzle 17 (which can be configured and positioned as an upper oxidant flow nozzle 17) can have a length X and a height Y measured at the burner face plane 10fp. The length X can be defined so that the staging nozzle 17 has an oxidant flow outlet 17o that extends from a leftmost position of the first fuel outlet 13f and/or second fuel outlet 15f to a rightmost position of the first fuel outlet 13f and/or second fuel outlet 15f. The height Y of the oxidant flow outlet 17o can be vertical distance of the largest portion of the outlet, a height of the outlet, or a diameter of the outlet (depending on the shape of the outlet, which can be oval shaped, circular shaped or polygonal shaped). The length X of the oxidant flow outlet 17o can be defined so that the oxidant flow outlet 17o is positioned over the first and second burner elements and extends laterally over an entirety of the length L of the first fuel outlet 13f and also extends laterally over an entirety of the length L of the second fuel outlet 15f at a position that is vertically spaced apart from and above the first inner fuel outlet 13f and the second inner fuel outlet 15f.

The vertical spacing between the first and second burner elements 13 and 15, the oxidant flow outlet 17o of the upper oxidant flow nozzle 17 and the port 11 for the pilot flame can also be defined to meet a pre-selected set of criteria to help facilitate providing a stable flame that can provide a low NOx emission profile while also permitting the flame to be generated from a fuel of natural gas, a fuel of hydrogen, or a fuel that is a mixture of hydrogen and natural gas. As may best be appreciated form FIG. 6, the top of the first outer oxidant flow outlet 13O of the first burner element 13 can be vertically spaced from the bottom of the second oxidant flow outlet 15o of the second burner element 15 by a first vertical spacing H1. The top of the second outer oxidant flow outlet 15o of the second burner element 15 can be vertically spaced from the bottom of the oxidant flow outlet 17o of the upper oxidant flow nozzle 17 by a second vertical spacing H2. The top of the pilot flame port 11 can also be vertically spaced from the bottom of the first outer oxidant flow outlet 13o of the first burner element 13 by a pilot flame vertical spacing H3 (which can also be considered a third vertical spacing H3).

The nozzle positioning for the first and second burner elements 13 and 15, the pilot flame port 11, and the upper oxidant flow nozzle 17 can be arranged to meet the following criteria to provide improved performance, improved stability of a generated flame, and lower NOx emissions:
(a) $2<=H1/hf<=20$, where H1/hf is the first vertical spacing H1 divided by the height hf of the inner fuel outlet;
(b) $2<=H2/hf<=20$, where H2/hf is the second vertical spacing H2 divided by the height hf of the inner fuel outlet;
(c) $2<=H3/hf<=20$, where H3/hf is the third vertical spacing H3 divided by the height hf of the inner fuel outlet; and
(d) $0.0<=B/L<=1.5$, where B is the offset distance B and L is the horizontal length L of the inner fuel outlet.

The nozzle overlap criteria of (d) noted above can help avoid the nozzles from being too far apart to help ensure that the fuel and oxidant can mix sufficiently well within a furnace to provide complete combustion of the fuel (or at least very near complete combustion of the fuel).

Additionally, the above noted design criteria (a), (b), and (c) can help ensure implementation of a safe light-off for the burner in a cold furnace without any CO breakout in the flue gases (a light-off can be a condition at which a flame is initially generated in a cold furnace at the start-up of the burner). An exemplary light-off sequence can be that the pilot burner 11 is utilized to help ignite the lower nozzle first fuel outlet 13f, and the flame from lower first burner element 13 in turn subsequently ignites the fuel output from the second fuel outlet 15f. The upper operational limits for initiation of flame generation via the light-off sequence can be near or at a condition in which incomplete combustion of the fuel leaving the furnace during start-up of the burner may occur while lower operational limits can be defined to help lower the NOx generation and minimize flame and/or flow interaction effects between the upper oxidant flow nozzle 17, first burner element 13 and second burner element 15.

The nozzle positioning of the above noted (a)-(d) criteria can be further improved upon by the first fuel outlet 13f and second fuel outlet 15f having the following dimensions: an aspect ratio of $5<=L/hf<=15$ (where L is the horizontal length L of the inner fuel outlet and hf is the height of the inner fuel outlet) while being operated so that fuel is output at a velocity range of 50-300 feet per second (ft/s), which is 15.24 meters per second (m/s) to 91.44 m/s, and oxidant is output from the first outer oxidant flow outlet 13o and the second outer oxidant flow outlet 15o at an oxygen velocity of 25 ft/s to 150 ft/s, which is 7.62 m/s to 45.72 m/s. The L/hf ratio range can be defined to help develop flat flames that cover greater bath surface area as compared to conventional round pipe, single oxy-fuel burners. The higher flame surface area facing the bath surface that can be formed can help to radiate a higher surface area of the bath, thereby reducing the cold spots in the furnace side of the bath. Also, the ratio ho/hf can be sized for the first and second burner elements 13 and 15 to yield a ratio of the fuel velocity output from the burner elements to the primary oxidant velocity output from the burner elements from 1 to 4.

Additionally, the oxidant flow outlet 17o of the upper oxidant flow nozzle 17 can have a dimension of $10<=X/Y<=40$, and $1<=X/L<=2.5$ (where L is the horizontal length L of the inner fuel outlet, X is the length of the upper oxidant flow nozzle 17, and Y is the height of the upper oxidant flow nozzle 17). The oxidant velocity output from the oxidant flow outlet 17o of the upper oxidant flow nozzle 17 can range from 25 ft/s to 150 ft/s, which is a velocity of 7.62 m/s to 45.72 m/s.

Operation of the nozzles and upper oxidant flow nozzle 17 can be adapted to help facilitate generation of a stable flame with low NOx emissions and minimal CO breakout from the furnace. The low and high limits of the oxidant staging in the upper oxidant flow nozzle 17 can be defined based on an optimal burner operation in a furnace. For example, the oxidant output from the oxidant flow outlet 17o of the upper oxidant flow nozzle 17 can be 5% to 30% of the overall oxidant flow output from the burner (e.g. 5% to 30% of the total oxidant flow output from the first burner element 13, second burner element 15, and upper oxidant flow nozzle 17). The higher limit on oxidant staging can be set such that overheating of the furnace top wall is prevented from heat release in the top part of the furnace. This oxidant flow output condition can be coupled to a requirement that the oxidant output from the first burner element 13 be the same flow rate of oxidant as the oxidant output from the second burner element 15 or about the same flow rate of oxidant (e.g. oxidant output from the first outer oxidant flow outlet 13o is the same rate of output as the oxidant output from the second outer oxidant flow outlet 15o or is within 10% or within 15% of being the same rate of oxidant output from the other burner element's oxidant flow outlet). This output oxidant from the first and second burner elements 13 and 15 can be 95% to 70% of the total oxidant flow output from the first outer oxidant flow outlet 13o, second outer oxidant flow outlet 15o, and oxidant flow outlet 17o of the upper oxidant flow nozzle 17.

The first and second burner elements 13 and 15 can be configured to provide different types of fuel staging. For example a flow rate of fuel output from the first fuel outlet 13f and second fuel outlet 15f can be the same when both burner elements are in an active mode. When one burner element is in an active mode and the other burner element is in a passive mode, the fuel output from each burner element can be different. For example, the passive burner element can output fuel from the fuel outlet of that burner element so that the fuel output from that active burner element is 65% to 95% of the total fuel output from the burner 10 and the fuel output from the passive burner element can be 35% to 5% of the total fuel output form the burner 10.

Active mode operation for a burner element (e.g. first burner element 13, second burner element 15, or both burner elements, etc.) can be appreciated from FIG. 5. For example, in an active mode, fuel can be output from the fuel control manifold 28 and passed to a burner element operating in the active mode so that the control valve 30 is open and the fuel is fed at a high rate to the burner element that is above a minimum fuel flow rate. When the burner element is in a passive mode, the control valve 30 can be fully closed so that only a minimum fuel flow rate is fed to the burner element via the fuel that is passable through the bypass conduit segment 31b that permits a minimum flow rate of fuel to bypass the closed control valve 30 to flow fuel to the burner element.

The control valves 30 can be controlled to permit all the burner elements to be in an active mode at the same time or can be configured to switch which of the burner elements is in an active mode and which is in a passive mode (e.g. alternate the active and passive mode cycles for a pre-selected active mode time cycle). For example, a control valve of the first fuel feed conduit 29a can be fully opened and the control valve 30 of the second fuel feed conduit 29b can be fully closed for a first pre-selected active mode time period (e.g. 15 seconds, 5 minutes, 3 hours, etc.). After this time period has passed, the control valves can be adjusted so that the control valve of the first fuel feed conduit 29a can be fully closed and the control valve 30 of the second fuel feed conduit 29b can be fully opened for a second pre-selected active mode time period (e.g. 15 seconds, 5 minutes, 3 hours, etc.). This switching between which burner element is active and which burner element is passive can be continued for multiple cycles. Such cycling can help provide low emission, prevent over-heating of metal at the hot side 10h of the burner and/or nearby portion of a sidewall on which the burner is mounted, and maintain or improve yield due to low oxygen atmosphere near bath surface. This is particularly true after a heating apparatus 1 has been started up and the average temperature is above an auto-ignition temperature of the fuel. In contrast, having both burner element active can help prevent a carbon monoxide (CO) breakout and help provide complete combustion during starting up of a cold furnace (e.g. while the heating apparatus is below the auto-ignition temperature of the fuel).

Operation of the burner when both the first and second burner elements 13 and 15 are in an active mode can be configured to provide an equivalence ratio of between 1.05 and 1.5 (e.g. $1.05 < $ equivalence ratio $< 1.5$ or an equivalence ratio that is greater than or equal to 1.05 and less than or equal to 1.5). It should be appreciated that, for a given fuel flow rate, the equivalence ratio can be determined as the ratio of theoretical stoichiometric oxidant flow to actual oxidant flow.

In situations where one burner element is in an active mode and the other is operated in a passive mode, each burner element can operate at a different equivalency ratio. It should be appreciated that the equivalency ratio is a ratio of fuel to oxidant where an equivalency ratio of 1.0 is a mix of fuel and oxidant for complete combustion, an equivalency ratio of more than 1 is a mixture of fuel and oxidant that is fuel rich (e.g. more fuel as compared to oxidant so that incomplete combustion of the fuel may occur) and an equivalency ratio that is less than 1 is a mixture of fuel and oxidant that is oxidant rich (e.g. more oxidant than is needed for complete combustion). The rich and lean operation strategy of the burner elements can help reduce the thermal NOx generated in the combustion process as compared to operation of the burner elements at close to stoichiometric conditions.

For instance, the passive burner element can be operated at an equivalency ratio that is between 0.1 and 1.0 (e.g. $0.1 < $ Equivalence ratio $< 1.0$ or an equivalence ratio that is greater than or equal to 0.1 and less than or equal to 1.0) and the active burner element can be operated at an equivalency ratio that is between 1.4 and 3.0 (e.g. $1.4 < $ Equivalence ratio $< 3.0$ or an equivalence ratio that is greater than or equal to 1.4 and less than or equal to 3). It should be appreciated that the additional oxidant that can be provided by the upper staging nozzle 17 can provide additional oxidant to help facilitate complete combustion of the fuel even though one or all of the burner elements may operate in a fuel rich condition (e.g. at an equivalency ratio that is more than 1).

The function of the control valves 30 can be controlled by a controller CTRL communicatively connected to the control valves. The controller can be communicatively connected to one or more sensors of the apparatus to monitor conditions in the furnace and/or the conduits. At least one of the sensors can be positioned in the furnace or chamber above the bath 2 or can be positioned to detect one or more conditions in the chamber above the bath or in the furnace. Such sensors can include, for example, temperature sensors, pressure sensors, and flow rate or mass flow sensors. The controller can be configured to automatically control the opening and closing of the control valves 30 in accordance with a pre-defined control algorithm defined in code stored in the controller's non-transitory memory so that when the processor of the controller runs the code, the controller communicates with the control valves 30 to adjust their positions based on the sensor data and any operator input that may be providable via one or more input devices (e.g. a computer communicatively connected to the controller, etc.). The controller CTRL can be configured to monitor and/or control operations of the burner 10 during the starting up of at least one burner so that the first burner element 13 and the second burner element 15 are in an active mode such that the first and second burner elements operate at an equivalence ratio of between 1.05 and 1.5.

After the apparatus for transient heating 1 is operating at a pre-selected operational temperature that is above an auto-ignition temperature of fuel fed to the at least one burner, the controller can communicate with the control valves 30 for switching the first burner element 13 from an active mode to a passive mode and subsequently switching the first burner element 13 from the passive mode to the active mode while also switching the second burner element 15 from the active mode to the passive mode after a first pre-selected time period. This switching of active and passive modes for the first and second burner elements 13 and 15 can occur multiple times in numerous cycles. In some configurations, the controller CTRL and control valves 30 can be configured so that the active mode for the burner elements is a mode at which an equivalency ratio is between 1.4 and 3.0 and the passive mode is a mode at which the equivalency ratio is between 0.1 and 1.0.

The controller CTRL can also be configured so that one or more burners 10 are operated so that oxidant output from an oxidant flow outlet 17o of the staging nozzle 17 is between 5% and 30% of an overall oxidant flow output from the burner 10 and oxidant output from the first burner element 13 is at a flow rate that is within 10% of an oxidant flow rate of oxidant output from the second burner element 15.

The controller CTRL can be configured to independently control fuel flow to each of the first inner nozzle 13IN and the second inner nozzle 15IN for the first and second burner elements 13 and 15 and also control distribution of the total oxidant flow to consist of a primary oxidant flow apportioned between the first annular nozzle 13AN and the second annular nozzle 15AN of the first and second burner elements 13 and 15 (e.g. first outer oxidant flow outlet 13o and second outer oxidant flow outlet 15o) and a secondary oxidant flow provided to the staging nozzle 17. The primary oxidant flow can be from 60% to 95% of the total oxidant flow and the secondary oxidant flow can be the remainder (e.g. 40% to 5% of the total oxidant flow). The primary oxidant flow can be apportioned between the first annular nozzle 13AN and the second annular nozzle 15AN in a ratio from 0.9 to 1.1 for the first and second burner elements.

The controller can also be programmed to operate the burner 10 in a proportional mode in which the total fuel flow is supplied to the first inner nozzle and the second inner nozzle of the first and second burner elements 13 and 15 (e.g. first inner fuel outlet 13f and second inner fuel outlet 15f) such that the equivalence ratio of the first burner element is from 1.05 to 1.5 and the equivalence ratio of the second burner element is from 1.05 to 1.5.

The controller CTRL can be programmed to operate the burner 10 in an alternating mode in which apportionment of the total fuel flow between the first inner nozzle of the first burner element 13 (e.g. first inner fuel outlet 13f and the second inner nozzle (e.g. second inner fuel outlet 15f) of the second burner element 15 switches back and forth between a first state in which the first burner element is active while the second burner element is passive and a second state in which the first burner element is passive while the first burner element is active. In such operational states, the controller CTRL can be configured so that the active burner element can be characterized by operation in an equivalence ratio from 1.4 to 3 and the passive burner element can be characterized by operation in an equivalence ratio from 0.1 to 1.

The controller CTRL can be configured to control the flow of fuel and oxidant to the burner so that the burner switches between the alternating mode and the proportional mode. Such switching can occur based on pre-selected operational criteria, operator input, or other criteria. The switching between these modes of operation can occur back in forth based on pre-selected cycles, use input, and/or other criteria.

Embodiments of the controller CTRL can have or otherwise utilize a feedback control loop defined to select between the active mode of operation and the passive mode of operation for the burner elements of the burner 10 based on sensor data from sensors positioned in the apparatus. The code run by the processor of the controller can define the feedback control loop or at least partially define the control loop.

Embodiments of the controller can include a workstation that runs an automated process control program that is also communicatively connected to the control valves 30, sensors, and other control elements. The controller can also include other types of computer devices that have a processor connected to a non-transitory computer readable medium having the code of the control program stored thereon and at least one transceiver for communicative connections to the control valves and sensors (e.g. via a network connection, wireless network connection, or wired communicative connection, etc.). One or more input devices can be connectable to the controller to permit a user to provide input to the controller. One or more output devices (e.g. a display, a printer, etc.) can be communicatively connected to the controller for providing output to the user as well.

The burner 10 may be deployed in a furnace 1, as shown in FIG. 1. The furnace 1 may be a reverberatory furnace or other type of furnace that can make use of the transient heating burner 10. The apparatus for transient heating can include a bath that can be sized to retain metal for melting the metal via transient heating in some embodiments. Sidewalls 6 can extend vertically above the bath and a roof, or ceiling can be positioned above the bath and be attached to the sidewalls to enclose the bath 2. An array of burners 3 can be positioned to combust a fuel and provide a flame within a chamber above the bath. The hot gases from the formed flame(s) can swirl or otherwise flow within the chamber above the bath of metal to provide transient heating to the metal to melt the metal within the bath 2.

The metal can be, for example, iron, aluminum, a non-ferrous metal, or another type of metal. The hot gases of the flame can pass toward a flue 5 for being output out of the chamber and away from the bath 2. The output hot gases can be emitted to the atmosphere directly or can be fed to another plant process for other uses (e.g. a heating medium for a heat exchanger, etc.).

At least one sidewall 6 and/or the roof can include at least one transient heating burner 10 that can be utilized in conjunction with other burners (e.g. oxy-fuel burners, regenerative burners, etc.) and/or as a substitute for such burners. In some embodiments, each burner 10 of the array of burners can be such a burner 10. In other embodiments, one or more of the burners 10 can be a transient heating burner that is positioned to generate a flame in conjunction with other pre-existing conventional burners 3 that may be positioned to generate a flame for the transient heating of metal within the bath 2. The arrangement of the burners can be utilized in conjunction with a controlled operation of the burners to provide a desired heating profile for a heating flow of hot gases within the chamber above the bath for heating the metal in the bath 2.

Each burner 10 can include a burner face configured to be positionable at an inner surface of a furnace. For instance, the burner 10 can be mounted so it is flush with an inner surface of the furnace. For example, the burner face for the burner can be configured to be flush with the sidewall 6 when the burner 10 is mounted to the sidewall 6. As another example, the burner face can also be configured to be flush with a roof when the burner 10 is mounted to the roof. As yet another example, the burner 10 can be mounted to the sidewall 6 or roof to be positionable at an inner surface of the furnace for feeding fuel and oxidant into a chamber above the bath 2. The burner face 10*f* of the burner can define a burner face plane 10*fp*. The burner face plane 10*fp* can be plane at which fuel and oxidant are output from the burner 10 for being fed into the chamber above the bath 2.

A computational fluid dynamics (CFD) analysis was carried out for a furnace having a configuration of the exemplary embodiment shown in FIG. 1 using different burner configurations. The two CFD simulations used identical conditions in the same type of furnace, but had different burner configurations. The first CFD evaluation was performed for an embodiment of the burner that is similar to the embodiment shown in FIG. 8. The second CFD evaluation was for a burner having a design similar to the embodiment show in FIG. 8 but without the upper oxidant flow nozzle 17. The fuel used in this simulation was natural gas and 100% oxygen by volume is used as the oxidant. The results for stray oxygen concentration near the bath surface for these two CFD evaluations are shown in FIG. 10 (without upper oxidant flow nozzle 17) and FIG. 11 (with upper oxidant flow nozzle 17).

Figure 10:
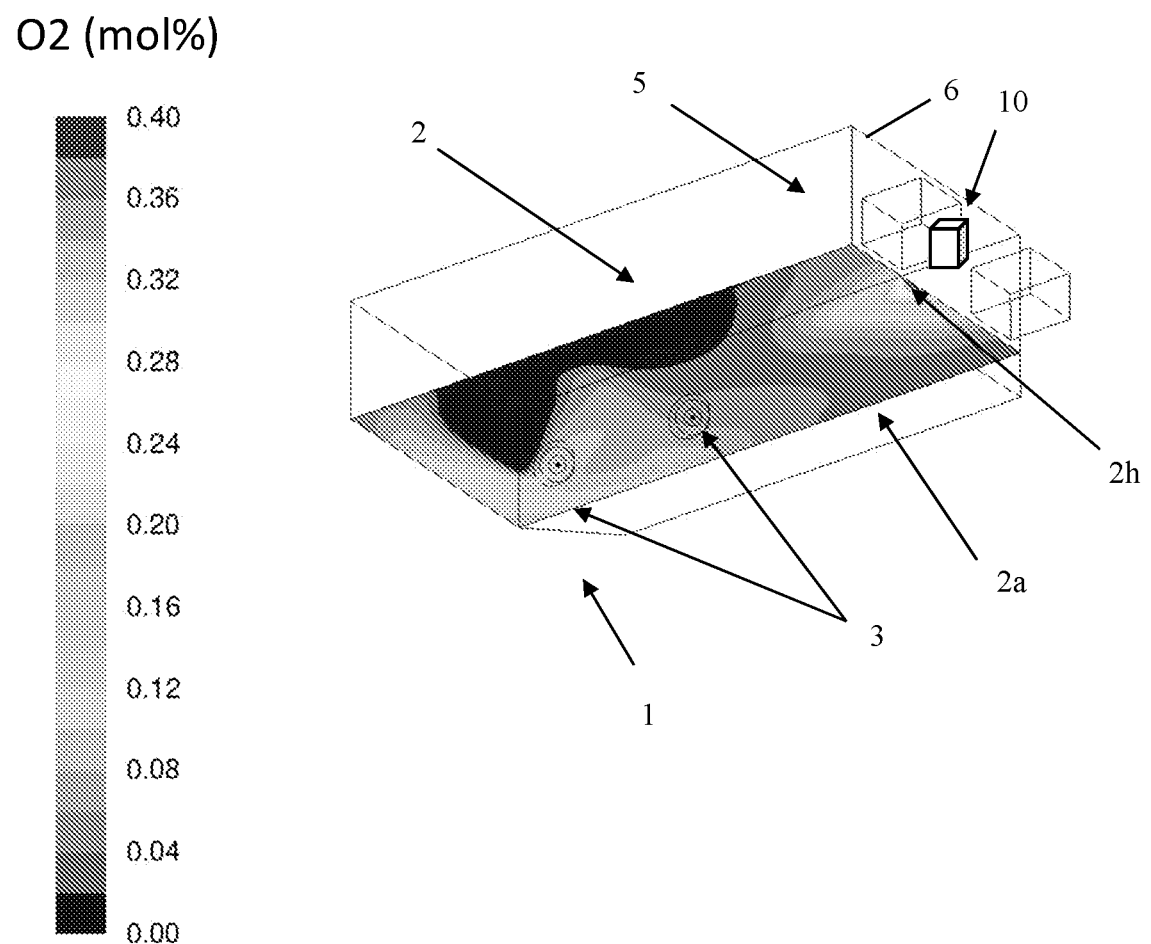
FIG. 10 illustrates results from a computational fluid dynamics evaluation of an embodiment of the burner 10 in a furnace.
Figure 11:
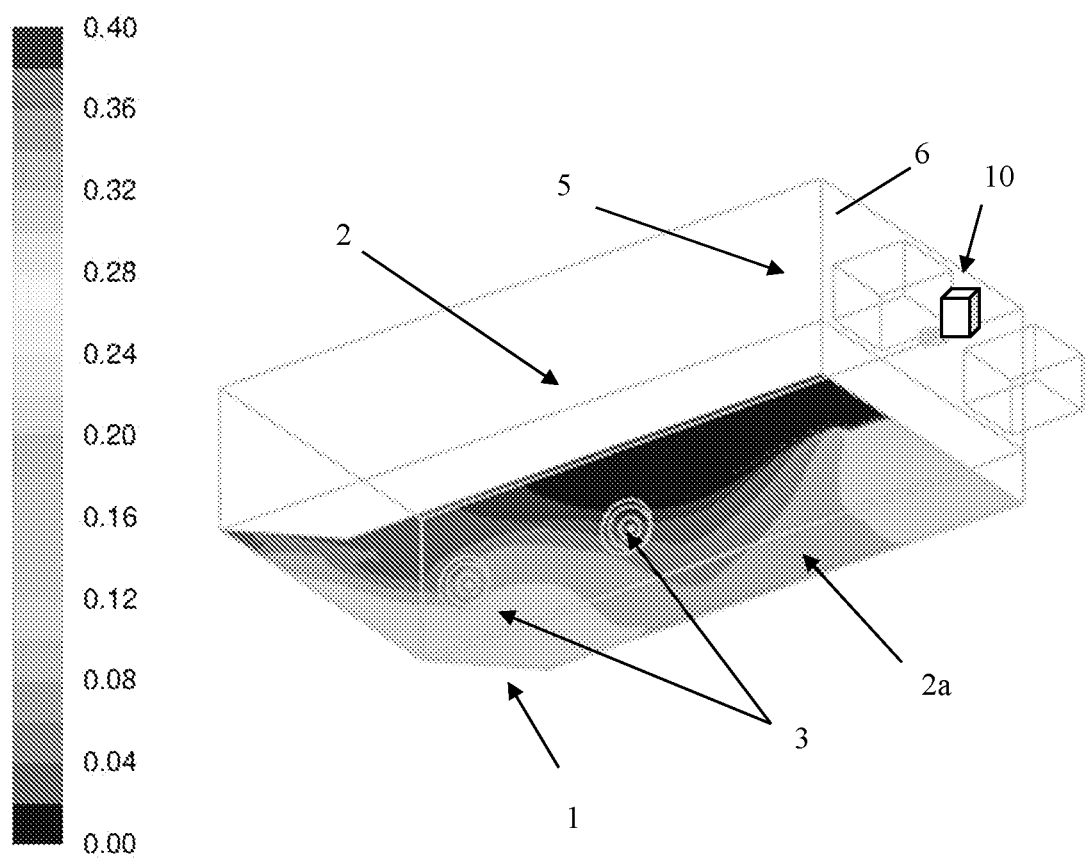
FIG. 11 illustrates results from a computational fluid dynamics evaluation of an embodiment of the burner 10 in a furnace.

FIGS. 10 and 11 each illustrate an oxygen concentration graph 2*a* at the surface of the bath 2. The graph illustrates results from the conducted CFD evaluations. FIG. 10 illustrates a high oxygen concentration region near the burner 10. FIG. 11 shows that use of the upper oxidant flow nozzle 17 permitted this region to be eliminated and that a more uniform and low concentration of oxygen was provided throughout the entirety of the bath 2.

Our evaluated embodiments of the burner 10 using the CFD analyses found that the use of the upper oxidant flow nozzle 17 can help reduce the oxygen concentration near the bath surface to ~5% (with this nozzle present) as compared to ~15% (with this nozzle omitted) when the upper oxidant flow nozzle 17 is not utilized in the burner. Use of the upper oxidant flow nozzle 17 can help to reduce or maintain a metal bath oxidation to a base level. Positioning of the upper oxidant flow nozzle 17 above the first and second burner elements 13 and 15 (and/or any other additional third nozzle that may output fuel and oxygen) was found to help move oxygen away from the metal bath surface as the located nozzles between upper oxidant flow nozzle 17 and bath surface created a blanketing surface that helped ovoid oxygen output from the burner 10 from flowing below the pilot flame port 11 toward the bath 2.

Evaluations of embodiments of our burner that we performed also showed that the utilization of the upper oxidant flow nozzle 17 above the first and second burner elements 13 and 15 (and/or any other additional third burner element that may output fuel and oxygen) helped to reduce NOx emissions. Use of the upper oxidant flow nozzle 17 was found to reduce the NOx emissions by as much as 50% as compared to an embodiment of the burner that only utilize first and second burner elements 13 and 15 without the upper oxidant flow nozzle 17.

An example burner 10 was also confidentially tested in our industrial scale laboratory furnace at a firing rate of 5 MMBtu/hr. The oxidant used in the testing was 100% by volume of oxygen. Table 1 below presents the experimental test points and corresponding exhaust emissions obtained from this conducted testing. In Table 1 below, fuel type NG is natural gas and fuel type H2 is hydrogen gas, CO2 is carbon dioxide present in the emissions, O2 is oxygen present in the emissions, NOx is nitrous oxide in the emissions, and CO is carbon monoxide in the emissions.

TABLE 1

Firing rate and exhaust emissions in a laboratory test furnace operated at average furnace temperature of 1900° F.

| | Firing rate MMBtu/hr | Fuel % by heating value | $CO_2$ % | $O_2$ % | NOx ppm | CO ppm | NOx @ 3% $O_2$ ppm | NOx @ 3% $O_2$ lb/MMBtu |
|---|---|---|---|---|---|---|---|---|
| One fuel nozzle active, and the other fuel nozzle passive | 5 | 100% NG | 85 | 7.96 | 514 | 14 | 711 | 0.06 |
| Both fuel nozzles active | 5 | 100% NG | 90.8 | 4.87 | 565 | 31 | 630 | 0.052 |
| | | 80% NG-20% H2 | 88.1 | 8.7 | 416 | 14 | 610 | 0.042 |
| | | 60% NG-40% H2 | 88 | 8.6 | 450 | 16 | 654 | 0.034 |

The Table 1 above shows that the burner 10 can operate under both operational modes for the burner, first with one inner fuel nozzle of a burner element active while the other inner fuel nozzle of the other burner element is passive and second, where both the first and second fuel burner elements 13 and 15 are active. This performance of the burner 10 was shown to help provide operational flexibility to the burner 10 based on plant operating needs. The data obtained from the testing shows that embodiments of the burner 10 can be fuel flexible (e.g. it can work with natural gas as a fuel and also, a mixture of natural gas and hydrogen). Additionally, the NOx and CO emissions are very low, which we believe are due to the structure and configuration of the dual-staged version of the burner. The dual staging and appropriate dimensions of the burner in accordance with the above noted design criteria (a)-(d) for example help create two flames that are output from the burner 10 with minimal flame interactions, avoid stoichiometric operation of individual burner elements of the burner 10, and still provide close to complete combustion of the fuels output from the burner 10.

Figure 12:
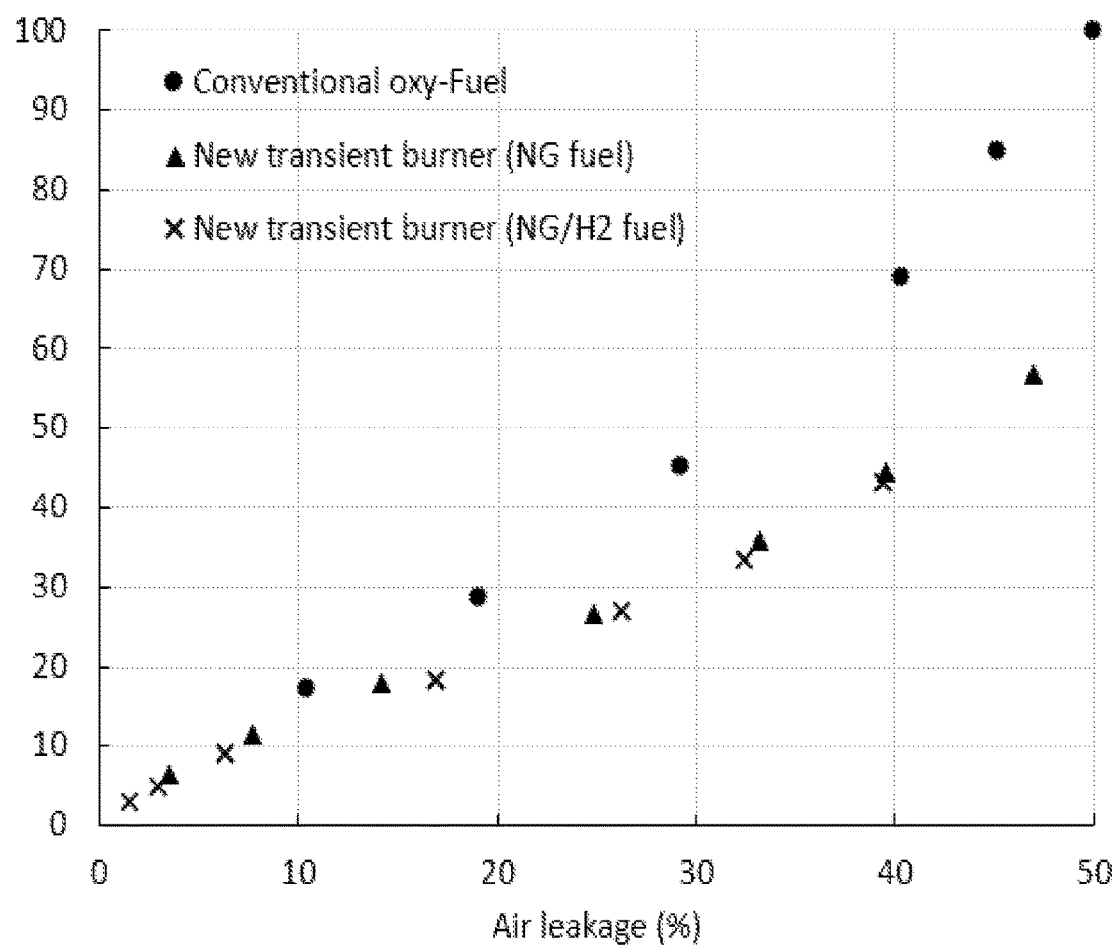
FIG. 12 is a graph comparing normalized NOx in pounds per Million British Thermal Unit (lbs/MMBtu) as a function of percent air leakage in the furnace for a conventional oxy-fuel burner and embodiments of a transient heating burner.

FIG. 12 is a graph illustrating a comparison of the normalized NOx emissions (lbs/MMBtu) between a conventional oxy-fuel burner and embodiments of our new transient heating burner as a function of percent air leakage in the furnace. The results for embodiments of our transient heating burner (one burner element active and another passive in cyclical operation as discussed herein) are presented for two cases with two different types of fuel: one with natural gas (NG), which is labeled as "New transient burner (NG fuel)" in FIG. 12 and another using 70% by heating value natural gas—30% by heating value hydrogen mixture, which is labeled as "New transient burner (NG/H2 fuel). The plots illustrated in FIG. 12 show that the embodiments of the new transient burner generates lower total NOx emissions by as much as 40% as compared to the conventional oxy-fuel burners. The total NOx emission from the new transient burner is, considering measurement uncertainty and furnace operating factors, similar when operated with natural gas or a mixture of Natural-Hydrogen fuel mixtures.

Embodiments of our burner were also found to provide fuel efficiency improvements and yield improvements based on CFD analysis that was performed for some embodiments of the burner 10 and transient heating apparatus 1.

For example, two CFD simulations were performed using natural gas fuel for a burner in a furnace for a batch load of 62,000 lbs (28,122.7 kg). The first CFD simulation used an air-fuel combustion arrangement using conventional burners ("Air" in Table 2). The second CFD simulation was for an embodiment of our burner 10 utilized in the furnace of FIG. 1 that was simulated to use hybrid combustion provided via an embodiment of our multiple staged transient heating burner 10 ("Hybrid" in Table 2, one air-fuel burner was replaced by one multiple staged transient heating burner). Table 2 shows the energy balance for the furnace. The embodiment of our burner 10 was found to help improve the efficiency of operation by about 9%. Melting time for metal within a bath was able to be reduced from 4.1 hours to 3.0 hours (which provided a production increase of about 26% by speeding up production by 1.1 hours) and provided a decrease in fuel usage of 26.6% by reducing fuel consumption from 1328 British Thermal Unit (BTU) per pound (lb) to 975 BTU/lb.

TABLE 2

Comparison of air combustion vs hybrid combustion

|  | Air | Hybrid |
| --- | --- | --- |
| Firing (MMBtu/hr | 20.00 | 21.50 |
| Preheat | 1.00 | 0.50 |
| Total Input | 21.00 (MMBtu/hr) | 22.00 (MMBtu/hr) |
| Scrap | 5.51 | 7.86 |
| Flue | 2.06 | 1.92 |
| Regen | 9.43 | 7.31 |

TABLE 2-continued

Comparison of air combustion vs hybrid combustion

|  | Air | Hybrid |
| --- | --- | --- |
| Wall | 2.85 | 3.49 |
| Unburned fuel | 1.06 | 1.19 |
| Total Output (MMBtu/hr | 20.92 | 21.76 |
| Efficiency | 27.5% | 36.2% |

We also compared applications of our burner in which natural gas was used as the fuel and in which a mixture of 30% hydrogen (H2) by heating value and 70% by heating value natural gas (NG) was used. Below Table 3 show results of these analyses. As can be appreciated from Table 3, the burner 10 was able to maintain its performance using both natural gas and natural gas/hydrogen mixtures for the conducted evaluation.

Table 3; comparison of furnace energy balance using blended fuel (NG+H2) and operation of only NG:

| Parameter | Blend: NG + H2 (Hot) | Base: NG (Hot) |
| --- | --- | --- |
| Firing | 21.50 | 21.50 |
| Preheat | 0.5 | 0.50 |
| Total Input (MMBtu/hr) | 22.00 | 22.00 |
| Scrap (MMBtu/hr) | 8.06 | 7.86 |
| Flue (MMBtu/hr) | 1.88 | 1.92 |
| Regen (MMBtu/hr) | 7.01 | 7.31 |
| Wall (MMBtu/hr) | 3.60 | 3.49 |
| Unburned fuel (MMBtu/hr) | 0.76 | 1.19 |
| Total Output (MMBtu/hr) | 21.31 | 21.76 |
| Efficiency | 37.1% | 36.2% |

Embodiments of the burner 10 can also utilize additional burner elements. For example, there can be a third burner element that is between the pilot flame port 11 and the first burner element 13. This third nozzle can be positioned and aligned to output fuel and oxidant into the heating apparatus 1 so it is output in central alignment (e.g. at a pitch of 0° and at a horizontal angle α of 0°). It is contemplated that other embodiments may also utilize one or more third burner elements that each have an inner fuel outlet surrounded by an outer oxidant flow outlet. The burner elements can be configured the same as the first and second burner elements 13 and 15, for example, but be arranged to provide a different fuel and/or oxidant flow path (e.g. output fuel to provide a pitch of 0° and a horizontal angle α of 0°, etc.).

As can be appreciated from the above, the apparatuses for transient heating (e.g. reverberatory furnaces) and burners that can be incorporated into such devices can be configured to include process control elements positioned and configured to monitor and control operations (e.g. temperature and pressure sensors, flow sensors, an automated process control system having at least one work station that includes a processor, non-transitory memory and at least one transceiver for communications with the sensor elements, valves, and controllers for providing a user interface for an automated process control system that may be run at the work station and/or another computer device of the system, etc.).

Embodiments of the burner 10 can utilize different types of fuel. For example, as an alternative (or in addition) to use of natural gas and hydrogen as possible fuel sources, embodiments can utilize an atomized liquid fuel or a pulverized solid fuel (e.g. pulverized coal) in a carrier gas or other fuel source.

It should be appreciated that "<=" refers to less than or equal to and "=>" refers to greater than or equal to. It should also be appreciated that a fuel can include a combustible material. Examples of a fuel can include natural gas, hydrogen gas, diesel, coal, or other fuel sources that can be combusted. Fuel can be passed through an inner nozzle of a burner element. Oxidant can refer to a fluid that includes a concentration of oxygen therein that can be utilized for combustion of fuel. The oxidant can be passed through an annular nozzle of a burner element that surrounds an inner nozzle of the burner element. In some embodiments, a fuel or other material can be included with the oxidant passed through the annular nozzle.

Embodiments can be adapted to specially address a particular set of design criteria. For example, it is contemplated that a particular feature described, either individually or as part of an embodiment, can be combined with other individually described features, or parts of other embodiments. The elements and acts of the various embodiments described herein can therefore be combined to provide further embodiments. Thus, while certain exemplary embodiments of methods of transient heating, apparatuses for transient heating, burners for reverberatory furnaces and methods of making and using the same have been shown and described above, it is to be distinctly understood that the invention is not limited thereto but may be otherwise variously embodied and practiced within the scope of the following claims.

What is claimed is:

1. A burner for transient heating of a furnace, the burner comprising:
    a burner face configured to be positioned at an inner surface of the furnace when the burner is mounted in the furnace, the burner face defining a burner face plane;
    a first burner element having a first annular nozzle configured to flow primary oxidant surrounding a first inner nozzle configured to flow fuel;
    a second burner element having a second annular nozzle configured to flow primary oxidant surrounding a second inner nozzle configured to flow fuel, the second burner element being positioned adjacent to and spaced apart from the first burner element;
    a staging nozzle configured to flow secondary oxidant, the staging nozzle being positioned adjacent to and spaced apart from the second burner element,
    wherein the second burner element is positioned between the staging nozzle and the first burner element;
    wherein the first inner nozzle and the second inner nozzle each have a major axis defined by a major axis length L measured at the burner face plane, a minor axis defined by a minor axis height $h_f$ measured at the burner face plane, and a fuel nozzle aspect ratio of $5<=L/h_f<=15$;
    wherein the staging nozzle has a major axis defined by a major axis length X measured at the burner face plane and a minor axis defined by a minor axis height Y measured at the burner face plane; and
        wherein the major axis of the first inner nozzle, the major axis of the second inner nozzle, and the major axis of the staging nozzle are substantially parallel with each other to within a deviation of less than or equal to 5°.

2. The burner of claim 1, wherein the staging nozzle has an aspect ratio of $10<=X/Y<=40$.

3. The burner of claim 1, wherein $1<=X/L<=2.5$.

4. The burner of claim 1,
    wherein the second burner element is spaced apart from the first burner element by a distance H1, wherein $2<=H1/h_f<=20$; and
    wherein the staging nozzle is spaced apart from the second burner element by distance H2, wherein $2<=H2/h_f<=20$.

5. The burner of claim 1,
    wherein the minor axis of the first inner nozzle is offset from the minor axis of the second inner nozzle by a distance B, wherein $0<B/L<=1.5$; and
    wherein the minor axis of the first inner nozzle and the minor axis of the second inner nozzle are substantially parallel to each other to within a deviation of less than or equal to 5°.

6. The burner of claim 1, further comprising:
    a pilot flame port positioned adjacent to and spaced apart from the first burner element by a distance of H3;
    wherein the first burner element is positioned between the second burner element and the pilot flame port; and
    wherein $2<=H3/h_f<=20$.

7. The burner of claim 1, further comprising:
    a first fuel conduit configured to supply fuel to the first inner nozzle, the first fuel conduit having a longitudinal axis aligned with a direction of fuel flow in the first fuel conduit, the longitudinal axis intersecting the burner face plane at an angle α with respect to perpendicular and at a complementary angle (90°−α) with respect to the major axis of the first inner nozzle;
    a second fuel conduit configured to supply fuel to the second inner nozzle, the second fuel conduit having a longitudinal axis aligned with a direction of fuel flow in the second fuel conduit, the longitudinal axis intersecting the burner face plane at an angle α with respect to perpendicular and at a complementary angle (90°−α) with respect to the major axis of the second inner nozzle;
    wherein longitudinal axis of the first fuel conduit and the longitudinal axis of the second fuel conduit are angled with respect to each other by an angle of 2α; and
    wherein $0<α<=20°$.

8. The burner of claim 7, wherein $5°<α<=20°$.

9. The burner of claim 7,
    wherein the longitudinal axis of the first fuel conduit intersects the plane defined by the major axis and the minor axis of the first inner nozzle at an angle β with respect to perpendicular and at a complementary angle (90°−β) with respect to the minor axis of the first inner nozzle;
    wherein the longitudinal axis of the second fuel conduit intersects the plane defined by the major axis and the minor axis of the second inner nozzle at an angle β with respect to perpendicular and at a complementary angle (90°−β) with respect to the minor axis of the second inner nozzle;
    wherein longitudinal axis of the first fuel conduit and the longitudinal axis of the second fuel conduit are each angled away from the staging nozzle; and
    wherein $0<β<=10°$.

10. The burner of claim 1, further comprising:
    a first fuel conduit configured to supply fuel to the first inner nozzle, the first fuel conduit having a longitudinal axis aligned with a direction of fuel flow in the first fuel conduit, the longitudinal axis intersecting the burner face plane at an angle β with respect to perpendicular and at a complementary angle (90°−β) with respect to the minor axis of the first inner nozzle;

a second fuel conduit configured to supply fuel to the second inner nozzle, the second fuel conduit having a longitudinal axis aligned with a direction of fuel flow in the second fuel conduit, the longitudinal axis intersecting the burner face plane at an angle β with respect to perpendicular and at a complementary angle (90°−β) with respect to the minor axis of the second inner nozzle;

wherein longitudinal axis of the first fuel conduit and the longitudinal axis of the second fuel conduit are each angled away from the staging nozzle; and wherein 0<β<=10°.

11. The burner of claim 1, wherein a total fuel flow and a total oxidant flow are provided to the burner in an equivalence ratio, wherein an equivalence ratio of 1 denotes a stoichiometric ratio of fuel to oxidant, an equivalence ratio of greater than 1 denotes a fuel-rich stoichiometry, and an equivalence ratio of less than 1 denotes a fuel-lean stoichiometry, the burner further comprising:

a controller programmed:
to independently control fuel flow to each of the first inner nozzle and the second inner nozzle; and
to control distribution of the total oxidant flow to consist of a primary oxidant flow apportioned between the first annular nozzle and the second annular nozzle and a secondary oxidant flow provided to the staging nozzle, wherein the primary oxidant flow is from 60% to 95% of the total oxidant flow.

12. The burner of claim 11, wherein the primary oxidant flow apportioned between the first annular nozzle and the second annular nozzle in a ratio from 0.9 to 1.1.

13. The burner of claim 11, wherein the controller is programmed to operate the burner in a proportional mode in which the total fuel flow is supplied to the first inner nozzle and the second inner nozzle such that the equivalence ratio of the first burner element is from 1.05 to 1.5 and the equivalence ratio of the second burner element is from 1.05 to 1.5.

14. The burner of claim 11, wherein the controller is programmed to operate the burner in an alternating mode in which apportionment of the total fuel flow between the first inner nozzle and the second inner nozzle switches back and forth between a first state in which the first burner element is active while the second burner element is passive and a second state in which the first burner element is passive while the first burner element is active;

wherein an active burner element is characterized by an equivalence ratio from 1.4 to 3 and a passive burner element is characterized by an equivalence ratio from 0.1 to 1.

15. The burner of claim 14, wherein the controller is programmed to switch between the first state and the second state based on one or more of passage of a predetermined time period and data from a sensor positioned to detect at least one condition in the furnace.

16. The burner of claim 1,
wherein the first annular nozzle and the second annular nozzle each have a major axis and a minor axis coincident with the major axis and the minor axis of the first inner nozzle and the second inner nozzle, respectively, wherein the minor axis of each of the first annular nozzle and the second annular nozzle is defined by a height $h_o$;

wherein fuel exits each of the first inner nozzle and the second inner nozzle at a fuel velocity;

wherein primary oxidant exits each of the first annular nozzle and the second annular nozzle at a primary oxidant velocity; and wherein a ratio $h_o/h_f$ is sized to yield a ratio of the fuel velocity to the primary oxidant velocity from 1 to 4.

17. The burner of claim 1, further comprising:
a pilot flame port positioned below the first burner element, a top of the pilot flame port being vertically spaced from a bottom of the first annular nozzle by a third vertical spacing H3 such that 2<=H3/$h_f$<=20; and wherein a bottom of the second burner element is spaced apart from a top of the first annular nozzle by a first vertical distance H1, wherein 2<=H1/$h_f$<=20; and wherein a bottom of the staging nozzle is spaced apart from a top of the second annular nozzle by a second vertical distance H2, wherein 2<=H2/$h_f$<=20; and wherein the minor axis of the first inner nozzle is offset from the minor axis of the second inner nozzle by a distance B, wherein 0<B/L<=1.5; and wherein the minor axis of the first inner nozzle and the minor axis of the second inner nozzle are substantially parallel to each other to within a deviation of less than or equal to 5°.

18. A furnace comprising:
a wall;
a roof;
a bath of solid and/or liquid material; and
the burner of claim 1 positioned in the wall so that the first burner element is closer to bath than the second burner element and the staging nozzle is closer to the roof than the second burner element.

19. A method of operating the burner of claim 1 in a furnace, the method comprising:

flowing a total oxidant flow to the burner consisting of a primary oxidant flow apportioned between the first annular nozzle and the second annular nozzle and a secondary oxidant flow provided to the staging nozzle, wherein the primary oxidant flow is from 60% to 95% of the total oxidant flow, and wherein the primary oxidant flow apportioned between the first annular nozzle and the second annular nozzle in a ratio from 0.9 to 1.1;

flowing a total fuel flow to the burner, and switching operation of the burner between a proportional mode and an alternating mode;

wherein in the proportional mode, the total fuel flow is apportioned between the first inner nozzle and the second inner nozzle such that the equivalence ratio of the first burner element is from 1.05 to 1.5 and the equivalence ratio of the second burner element is from 1.05 to 1.5;

and wherein in the alternating mode, the total fuel flow apportioned between the first inner nozzle and the second inner nozzle switches back and forth between a first state in which the first burner element is active while the second burner element is passive and a second state in which the first burner element is passive while the first burner element is active, wherein an active burner element is characterized by an equivalence ratio from 1.4 to 3 and a passive burner element is characterized by an equivalence ratio from 0.1 to 1; and wherein an equivalence ratio of 1 denotes a stoichiometric ratio of fuel to oxidant, an equivalence ratio of greater than 1 denotes a fuel-rich stoichiometry, and an equivalence ratio of less than 1 denotes a fuel-lean stoichiometry.

\* \* \* \* \*